United States Patent
Hashimoto

(10) Patent No.: US 11,084,499 B2
(45) Date of Patent: Aug. 10, 2021

(54) ERRONEOUS OPERATION DETERMINATION DEVICE

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 431 days.

(21) Appl. No.: 15/979,890

(22) Filed: May 15, 2018

(65) Prior Publication Data
US 2018/0345989 A1    Dec. 6, 2018

(30) Foreign Application Priority Data

May 30, 2017    (JP) .............................. JP2017-106667

(51) Int. Cl.
| | |
|---|---|
| *B60W 50/10* | (2012.01) |
| *B60W 10/06* | (2006.01) |
| *B60W 10/18* | (2012.01) |
| *G06N 3/08* | (2006.01) |
| *G06N 3/04* | (2006.01) |

(Continued)

(52) U.S. Cl.
CPC ............ *B60W 50/10* (2013.01); *B60W 10/06* (2013.01); *B60W 10/18* (2013.01); *G06N 3/0454* (2013.01); *G06N 3/08* (2013.01); *B60W 2050/0089* (2013.01); *B60W 2520/06* (2013.01); *B60W 2540/10* (2013.01); *B60W 2540/12* (2013.01); *B60W 2540/22* (2013.01); *B60W 2710/06* (2013.01); *B60W 2710/18* (2013.01); *G06N 3/0445* (2013.01); *G06N 20/10* (2019.01)

(58) Field of Classification Search
CPC ................ B60W 50/10; B60W 10/06; B60W 2050/0089; B60W 10/18; G06N 3/08
USPC ............................................................ 701/1
See application file for complete search history.

(56) References Cited

U.S. PATENT DOCUMENTS

| | | | |
|---|---|---|---|
| 5,477,825 A | 12/1995 | Hattori et al. | |
| 8,593,272 B2* | 11/2013 | Heracles | B60W 50/10 340/441 |
| 9,776,644 B2* | 10/2017 | Chun | B60W 40/02 |

(Continued)

FOREIGN PATENT DOCUMENTS

| | | |
|---|---|---|
| EP | 3 272 611 A1 | 1/2018 |
| JP | H06-249007 A | 9/1994 |

(Continued)

*Primary Examiner* — Khoi H Tran
*Assistant Examiner* — Rodney P King
(74) *Attorney, Agent, or Firm* — Oliff PLC

(57) ABSTRACT

An erroneous operation determination device is configured to determine whether an occupant performs an erroneous operation of misstepping on a first operation pedal instead of a second operation pedal. The erroneous operation determination device includes an electronic control unit configured to acquire operation information relating to an operation content of the first operation pedal by the occupant and determine whether the occupant performs an erroneous operation based on the acquired operation information. The electronic control unit is configured to learn at least one of the operation content of the first operation pedal and an operation content of the second operation pedal and determine whether the occupant performs an erroneous operation based on a result of the learning.

12 Claims, 9 Drawing Sheets

(51) Int. Cl.
 *B60W 50/00* (2006.01)
 *G06N 20/10* (2019.01)

(56) References Cited

U.S. PATENT DOCUMENTS

| | | | |
|---|---|---|---|
| 10,054,948 B2* | 8/2018 | Teshima | B60Q 5/00 |
| 10,192,171 B2* | 1/2019 | Taylor | G06K 9/00832 |
| 2010/0206647 A1* | 8/2010 | Ishii | B60L 50/66 |
| | | | 180/6.24 |
| 2012/0179304 A1 | 7/2012 | Tokumochi | |
| 2012/0310473 A1* | 12/2012 | Yoshii | G01P 21/00 |
| | | | 701/33.1 |
| 2012/0322616 A1* | 12/2012 | Fukui | B60W 50/087 |
| | | | 477/94 |
| 2012/0329605 A1* | 12/2012 | Kawamura | B60W 50/10 |
| | | | 477/115 |
| 2014/0081498 A1* | 3/2014 | Weng | B60L 15/2009 |
| | | | 701/22 |
| 2015/0291031 A1* | 10/2015 | Morimoto | G06K 9/00812 |
| | | | 701/70 |
| 2015/0375745 A1* | 12/2015 | Yaguchi | B60W 20/00 |
| | | | 701/70 |
| 2016/0298762 A1 | 10/2016 | Bang | |
| 2020/0216079 A1* | 7/2020 | Mahajan | B60W 40/09 |

FOREIGN PATENT DOCUMENTS

| | | |
|---|---|---|
| JP | 2011-201396 A | 10/2011 |
| JP | 2012-144053 A | 8/2012 |
| JP | 2013-155632 A | 8/2013 |
| JP | 2015-000625 A | 1/2015 |
| WO | 2016/170786 A1 | 10/2016 |

\* cited by examiner

FIG. 7
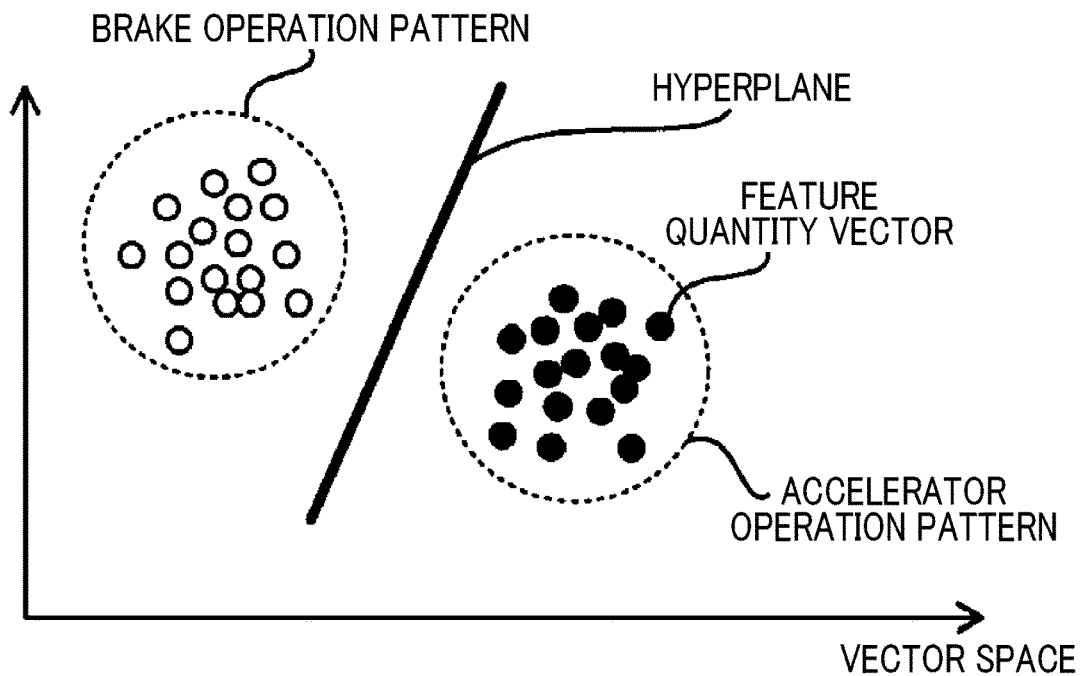
FIG. 8
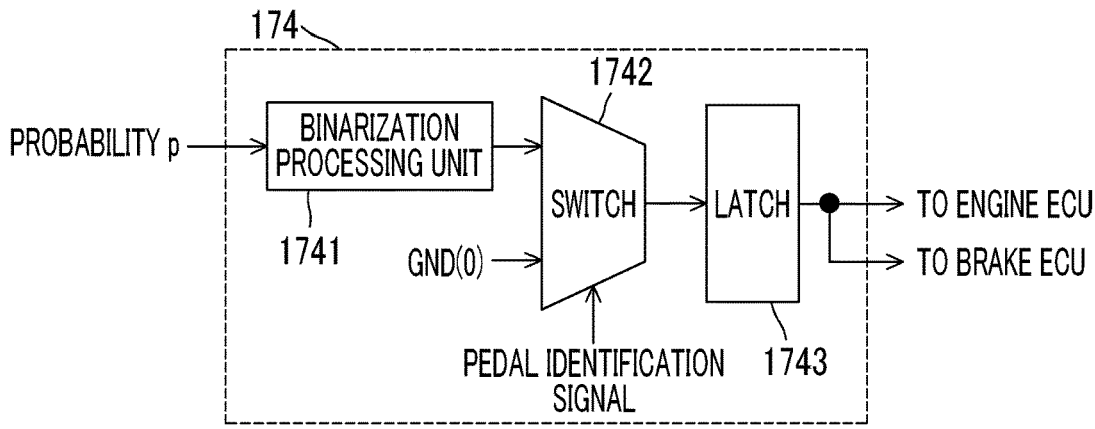
FIG. 9
| CLASSIFICATION RESULT | PROBABILITY p | PEDAL IDENTIFICATION SIGNAL | SWITCH OUTPUT | LATCH OUTPUT |
|---|---|---|---|---|
| ACTUAL OPERATION PATTERN = ACCELERATOR OPERATION PATTERN | 0 | 1 (BRAKE OPERATION) → SWITCH OFF | 0 | 0 |
| | | 0 (ACCELERATOR OPERATION) → SWITCH ON | 0 | 0 |
| ACTUAL OPERATION PATTERN = BRAKE OPERATION PATTERN | 1 | 1 (BRAKE OPERATION) → SWITCH OFF | 0 | 0 |
| | | 0 (ACCELERATOR OPERATION) → SWITCH ON | 1 (ERRONEOUS OPERATION) | 1 |

ERRONEOUS OPERATION DETERMINATION DEVICE

INCORPORATION BY REFERENCE

The disclosure of Japanese Patent Application No. 2017-106667 filed on May 30, 2017 including the specification, drawings and abstract is incorporated herein by reference in its entirety.

BACKGROUND

1. Technical Field

The present disclosure relates to a technical field of an erroneous operation determination device for determining whether or not an occupant missteps on an operation pedal of the vehicle.

2. Description of Related Art

As an example of the erroneous operation determination device described above, Japanese Unexamined Patent Application Publication No. 2015-000625 (JP 2015-000625 A) discloses an erroneous operation determination device that, in a case where stepping force of an accelerator pedal exceeds a predetermined threshold, determines that an occupant missteps on the accelerator pedal instead of a brake pedal. As another example of the erroneous operation determination device, Japanese Unexamined Patent Application Publication No. 2012-144053 (JP 2012-144053 A) discloses an erroneous operation determination device that selects a table having a range of a change amount of an accelerator operation amount to be misstepping with respect to the same accelerator operation amount wider in a case where an absolute value of a longitudinal acceleration is greater than a threshold than in a case where an absolute value of a longitudinal acceleration is smaller than a threshold, and applies a current accelerator operation amount to the selected table to determine whether or not an occupant missteps on an accelerator pedal instead of a brake pedal. In addition, though not a document that discloses an erroneous operation determination device, as a related art document, WO 2016/170786 is exemplified.

SUMMARY

An operation content of an operation pedal such as an accelerator pedal, a brake pedal, or the like may vary. For example, the operation content of the operation pedal may vary for each occupant. Alternatively, for example, even the operation content of the operation pedal of the same occupant may vary depending on a difference in physical condition, feeling, or the like (or other factors) of the occupant. However, the erroneous operation determination device described in JP 2015-000625 A and JP 2012-144053 A described above does not take variation of the operation content of the operation pedal described above into consideration. Specifically, in the erroneous operation determination device described in JP 2015-000625 A described above, the threshold that is used for determining whether or not the occupant missteps on the accelerator pedal instead of the brake pedal is set without taking variation of the operation content of the operation pedal into consideration. In the erroneous operation determination device described in JP 2012-144053 A described above, the table that is used for determining whether or not the occupant missteps on the accelerator pedal instead of the brake pedal is set without taking variation of the operation content of the operation pedal into consideration. For this reason, a technical problem occurs that the determination accuracy about whether or not the occupant missteps on the accelerator pedal instead of the brake pedal may be deteriorated.

The technical problem described above occurs similarly in an erroneous operation determination device that determines whether or not the occupant missteps on a certain operation pedal instead of another pedal, as well as an erroneous operation determination device that determines whether or not the occupant missteps on the accelerator pedal instead of the brake pedal.

The disclosure provides an erroneous operation determination device capable of determining whether or not an occupant missteps on an operation pedal of a vehicle with relatively high accuracy.

An aspect of the disclosure relates to an erroneous operation determination device configured to, in a vehicle including a first operation pedal and a second operation pedal that are operable respectively by an occupant for driving the vehicle, determine whether or not the occupant performs an erroneous operation of misstepping on the first operation pedal instead of the second operation pedal. The erroneous operation determination device includes an electronic control unit. The electronic control unit is configured to acquire operation information relating to an operation content of the first operation pedal by the occupant, and determine whether or not the occupant performs the erroneous operation based on the acquired operation information. The electronic control unit is configured to learn at least one of the operation content of the first operation pedal and an operation content of the second operation pedal, and determine whether or not the occupant performs the erroneous operation based on a result of learning of at least one of the operation content of the first operation pedal and the operation content of the second operation pedal.

According to the aspect of the disclosure, in determining whether or not the occupant performs the erroneous operation, the result of learning of at least one of the operation content of the first operation pedal and the operation content of the second operation pedal is used in addition to the operation information. For this reason, compared to a comparative example where the result of learning of the operation content of the first operation pedal and the operation content of the second operation pedal is not used, the erroneous operation determination device can appropriately determine whether or not the occupant performs the erroneous operation while taking variation of at least one of the operation content of the first operation pedal and the operation content of the second operation pedal into consideration. For this reason, deterioration of the determination accuracy about whether or not the occupant performs the erroneous operation is appropriately suppressed. As a result, the erroneous operation determination device can determine whether or not the occupant performs the erroneous operation with relatively high accuracy.

In the erroneous operation determination device according to the aspect of the disclosure, the electronic control unit may be configured to learn at least one of the operation content of the first operation pedal when the occupant actually operates the first operation pedal in at least a part of a period during which the vehicle is traveling and the operation content of the second operation pedal when the occupant actually operates the second operation pedal.

According to the aspect of the disclosure, since the actual operation content of the occupant is learned while the vehicle is traveling, deterioration of the determination accuracy about whether or not the occupant performs the erroneous operation is appropriately suppressed.

In the erroneous operation determination device according to the aspect of the disclosure, the electronic control unit may be configured to separately learn at least one of the operation content of the first operation pedal and the operation content of the second operation pedal under a situation in which the vehicle moves forward and at least one of the operation content of the first operation pedal and the operation content of the second operation pedal under a situation in which the vehicle moves backward.

According to the aspect of the disclosure, the operation content of the first operation pedal by the occupant under a situation in which the vehicle is moving forward may be different from the operation content of the first operation pedal by the occupant under a situation in which the vehicle is moving backward. Similarly, the operation content of the second operation pedal by the occupant under a situation in which the vehicle is moving forward may be different from the operation content of the second operation pedal by the occupant under a situation in which the vehicle is moving backward. In consideration of the difference of the operation content described above, in the above-described aspect, the operation content under a situation in which the vehicle is moving forward and the operation content under a situation in which the vehicle is moving backward are separately learned. For this reason, the erroneous operation determination device can determine whether or not the occupant performs the erroneous operation under a situation in which the vehicle is moving forward and whether or not the occupant performs the erroneous operation under a situation in which the vehicle is moving backward with higher accuracy.

In the erroneous operation determination device according to the aspect of the disclosure that separately learns the operation content under a situation in which the vehicle moves forward and the operation content under a situation in which the vehicle moves backward as described above, the electronic control unit may be configured to determine whether or not the occupant performs the erroneous operation under the situation in which the vehicle is moving forward based on the acquired operation information under the situation in which the vehicle moves forward and a result of learning of at least one of the operation content of the first operation pedal and the operation content of the second operation pedal under the situation in which the vehicle moves forward. The electronic control unit may be configured to determine whether or not the occupant performs the erroneous operation under the situation in which the vehicle is moving backward based on the acquired operation information under the situation in which the vehicle moves backward and a result of learning of at least one of the operation content of the first operation pedal and the operation content of the second operation pedal under a situation in which the vehicle moves backward.

According to the aspect of the disclosure, the erroneous operation determination device can determine whether or not the occupant performs the erroneous operation under a situation in which the vehicle is moving forward and whether or not the occupant performs the erroneous operation under a situation in which the vehicle is moving backward with higher accuracy.

In the erroneous operation determination device according to the aspect of the disclosure, the electronic control unit may be configured to adjust a criterion for determination in determining whether or not the occupant performs the erroneous operation based on a result of learning of at least one of the operation content of the first operation pedal and the operation content of the second operation pedal, and then, determine whether or not the occupant performs the erroneous operation. According to the aspect of the disclosure, the erroneous operation determination device can appropriately determine whether or not the occupant performs the erroneous operation also based on the result of learning of at least one of the operation content of the first operation pedal and the operation content of the second operation pedal.

In the erroneous operation determination device according to the aspect of the disclosure, the electronic control unit may be configured to determine whether or not the occupant performs the erroneous operation using a learning model having the operation information as input and a determination result relating to whether a pattern of an operation content indicated by the input operation information is a pattern of the operation content of the first operation pedal or a pattern of the operation content of the second operation pedal as output. The electronic control unit may be configured to make the learning model learn at least one of the operation content of the first operation pedal and the operation content of the second operation pedal to learn at least one of the operation content of the first operation pedal and the operation content of the second operation pedal.

According to the aspect of the disclosure, the electronic control unit can appropriately learn at least one of the operation content of the first operation pedal and the operation content of the second operation pedal using the learning model. The electronic control unit can appropriately determine whether or not the occupant performs the erroneous operation using the learning model that is made to learn at least one of the operation content of the first operation pedal and the operation content of the second operation pedal.

In the erroneous operation determination device according to the aspect of the disclosure that uses the learning model as described above, the learning model may be a model compliant with a neural network.

According to the aspect of the disclosure, the electronic control unit can appropriately learn at least one of the operation content of the first operation pedal and the operation content of the second operation pedal using the learning model compliant with the neural network and can appropriately determine whether or not the occupant performs the erroneous operation using the learning model compliant with the neural network.

In the erroneous operation determination device according to the aspect of the disclosure, learning of at least one of the operation content of the first operation pedal and the operation content of the second operation pedal may include learning of a difference between the operation content of the first operation pedal and the operation content of the second operation pedal.

According to the aspect of the disclosure, the electronic control unit can appropriately determine whether or not the occupant performs the erroneous operation using the learning result of the difference between the operation content of the first operation pedal and the operation content of the second operation pedal. Even with learning of one of the operation content of the first operation pedal and the operation content of the second operation pedal, the difference between the operation content of the first operation pedal and the operation content of the second operation pedal can be learned. The reason is that, in a case where the operation content of the first operation pedal is learned, determination can be made whether or not a certain operation content is the operation content of the first operation pedal. Similarly, the reason is that, in a case where the operation content of the second operation pedal is learned, determination can be made whether or not a certain operation content is the operation content of the second operation pedal.

In the erroneous operation determination device according to the aspect of the disclosure, the difference between the operation content of the first operation pedal and the operation content of the second operation pedal may be a difference in stroke amount between the first operation pedal and the second operation pedal.

In the erroneous operation determination device according to the aspect of the disclosure, the electronic control unit may be configured to i) when a pattern of the operation content indicated by the acquired operation information corresponds to a pattern of the operation content of the first operation pedal deduced from a result of learning of at least one of the operation content of the first operation pedal and the operation content of the second operation pedal, determine that the occupant does not perform the erroneous operation, and ii) when the pattern of the operation content indicated by the acquired operation information corresponds to a pattern of the operation content of the second operation pedal deduced from a result of learning of at least one of the operation content of the first operation pedal and the operation content of the second operation pedal, determine that the occupant performs the erroneous operation.

According to the aspect of the disclosure, the electronic control unit can appropriately determine whether or not the occupant performs the erroneous operation using the result of learning of the difference between the operation content of the first operation pedal and the operation content of the second operation pedal.

In the erroneous operation determination device according to the aspect of the disclosure, the first operation pedal may be an accelerator pedal, and the second operation pedal may be a brake pedal. According to the aspect of the disclosure, the electronic control unit can determine whether or not the occupant missteps on the accelerator pedal instead of the brake pedal.

In the erroneous operation determination device according to the aspect of the disclosure, the electronic control unit may be configured to further acquire state information relating to a state of the occupant and determine whether or not the occupant performs the erroneous operation based on both of the acquired operation information and the acquired state information. The electronic control unit may be configured to learn the state of the occupant and determine whether or not the occupant performs the erroneous operation based on a result of learning of the state of the occupant.

The state of the occupant who is operating the first operation pedal may be different from the state of the occupant who is operating the second operation pedal. For this reason, according to the aspect of the disclosure, the erroneous operation determination device can learn the state of the occupant, and then, can determine whether or not the occupant performs the erroneous operation based on the operation information, the state information, the result of learning of at least one of the operation content of the first operation pedal and the operation content of the second operation pedal described above, and the result of learning of the state of the occupant; thus, the erroneous operation determination device can determine whether or not the occupant performs the erroneous operation with higher accuracy.

In the erroneous operation determination device according to the aspect of the disclosure that learns the state of the occupants, and then, determines whether or not the occupant performs the erroneous operation based on the state information as described above, the state information may include information relating to the state of the occupant distinguishable between a case where the occupant operates the first operation pedal and a case where the occupant operates the second operation pedal. According to the aspect of the disclosure, it is possible to determine whether or not the occupant performs the erroneous operation based on the state information with higher accuracy.

In the erroneous operation determination device according to the aspect of the disclosure, the state information may include an output of a sensor that is mounted in the vehicle and detects the state of the occupant.

According to the aspect of the disclosure, the erroneous operation determination device can determine whether or not the occupant performs the erroneous operation with higher accuracy.

In the erroneous operation determination device according to the aspect of the disclosure, the first operation pedal and the second operation pedal may be constituted of a combination pedal that is used for both of operation as the first operation pedal and operation as the second operation pedal.

According to the aspect of the disclosure, in a case where the erroneous operation determination device is mounted in the vehicle including the combination pedal, the erroneous operation determination device can appropriately determine whether the occupant operates the combination pedal as an accelerator pedal or a brake pedal based on an operation signal indicating an operation content of the combination pedal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a graph showing a hyperplane classifying the feature quantity vector calculated by the feature extraction unit into two classes on the space to the feature quantity vector;

FIG. 8 is a block diagram showing the configuration of a control;

FIG. 9 is a table showing an output of a switch in the control shown in FIG. 8;

DETAILED DESCRIPTION OF EMBODIMENTS

Hereinafter, an embodiment of an erroneous operation determination device will be described. Hereinafter, a vehicle 1 to which an embodiment of an erroneous operation determination device of the disclosure is applied will be described.

(1) Configuration of Vehicle 1

Figure 1:
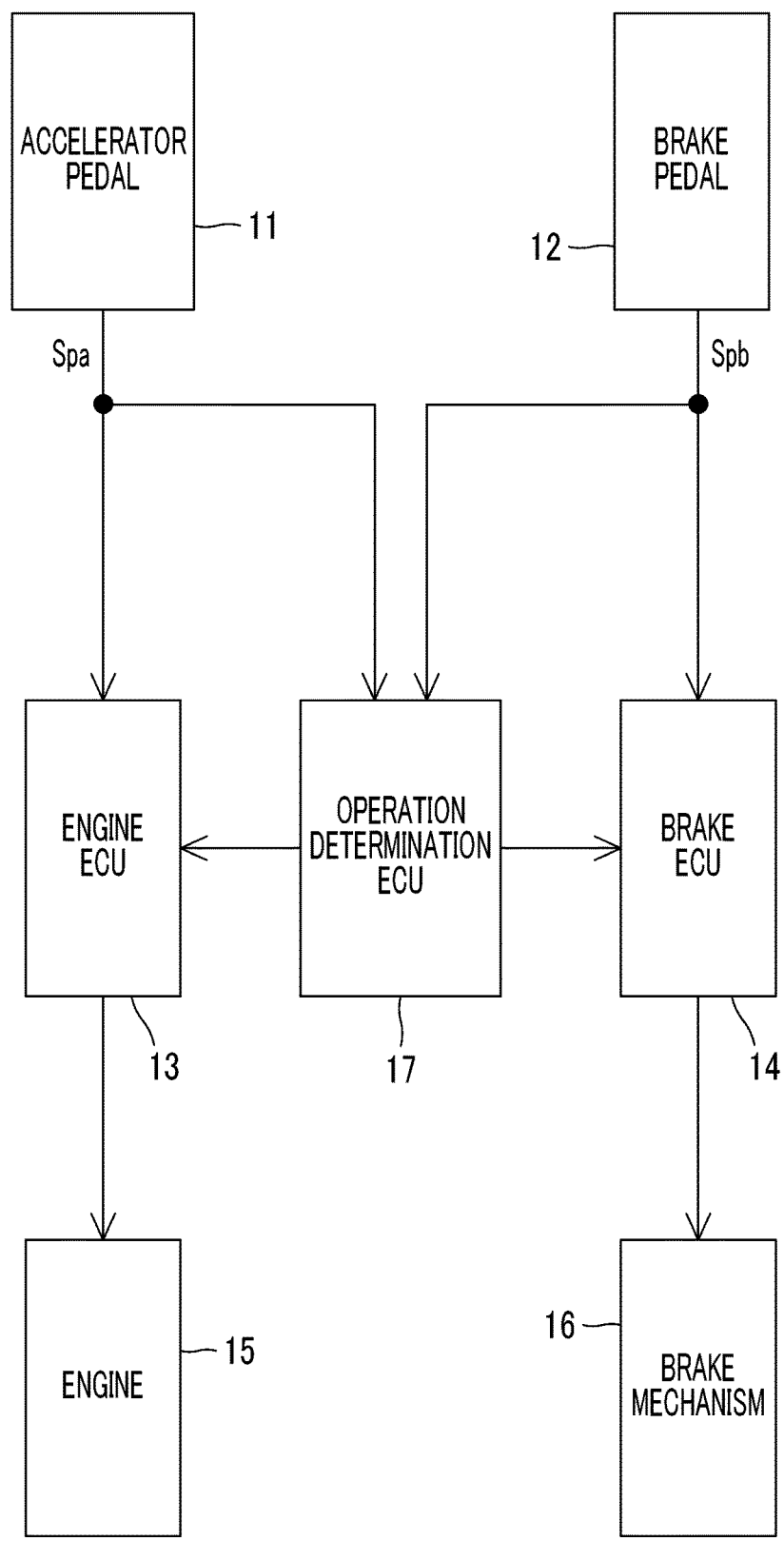
FIG. 1 is a block diagram showing the configuration of a vehicle of an embodiment.

First, the configuration of the vehicle 1 of the embodiment will be described referring to FIG. 1. FIG. 1 is a block diagram showing the configuration of the vehicle 1 of the embodiment.

As shown in FIG. 1, the vehicle 1 includes an accelerator pedal 11 as a specific example of a "first operation pedal", a brake pedal 12 as a specific example of a "second operation pedal", an engine electronic control unit (ECU) 13, a brake ECU 14, an engine 15, a brake mechanism 16, and an operation determination ECU 17 as a specific example of an "erroneous operation determination device".

The accelerator pedal 11 is an operation pedal that is operable (that is, steppable) by an occupant for adjusting drive power of the vehicle 1. The brake pedal 12 is an operation pedal that is operable (that is, steppable) by the occupant for adjusting braking force of the vehicle 1. The engine ECU 13 performs control such that the engine 15 adjusts the drive power of the vehicle 1 based on an accelerator operation signal Spa indicating an operation content of the accelerator pedal 11. The brake ECU 14 performs control such that the brake mechanism 16 adjusts the braking force of the vehicle 1 based on a brake operation signal Spb indicating an operation content of the brake pedal 12. The engine 15 is a drive source that generates the drive power of the vehicle 1. The brake mechanism 16 is a braking device that generates the braking force of the vehicle 1 using hydraulic pressure or the like.

The operation determination ECU 17 determines whether or not the occupant missteps on the accelerator pedal 11 instead of the brake pedal 12 (that is, performs an erroneous operation). That is, the operation determination ECU 17 determines whether or not the occupant who actually steps on the accelerator pedal 11 mistakes the accelerator pedal 11 for the brake pedal 12. In other words, the operation determination ECU 17 determines whether or not the occupant who intends to operate the brake pedal 12 erroneously operates the accelerator pedal 11.

In the embodiment, the operation determination ECU 17 determines whether or not the occupant performs the erroneous operation on an assumption that there is the difference between an accelerator operation pattern and a brake operation pattern. Note that the accelerator operation pattern is a time-series pattern of the accelerator operation signal Spa obtained in a case where the occupant who intends to operate the accelerator pedal 11 operates the accelerator pedal 11. The brake operation pattern is a time-series pattern of the brake operation signal Spb in a case where the occupant who intends to operate the brake pedal 12 operates the brake pedal 12.

Figure 2A:
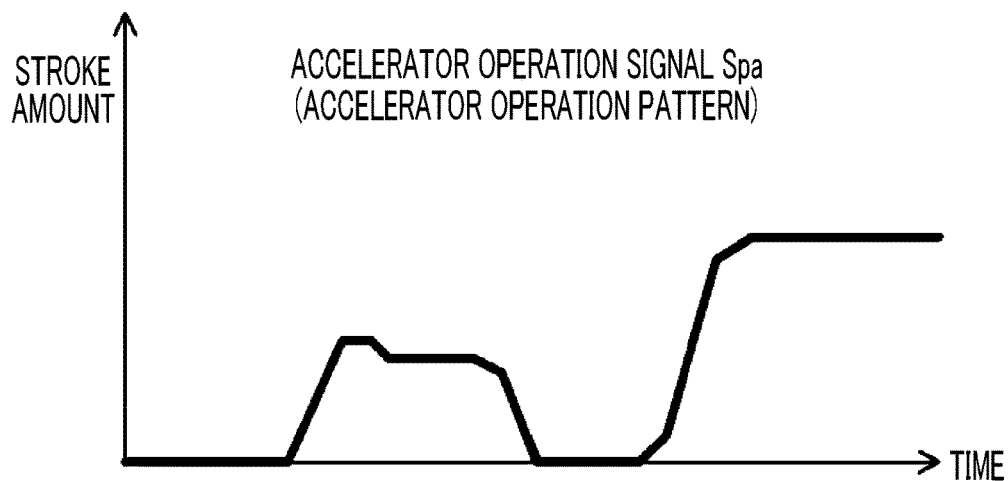
FIG. 2A is a graph showing an accelerator operation pattern.
Figure 2B:
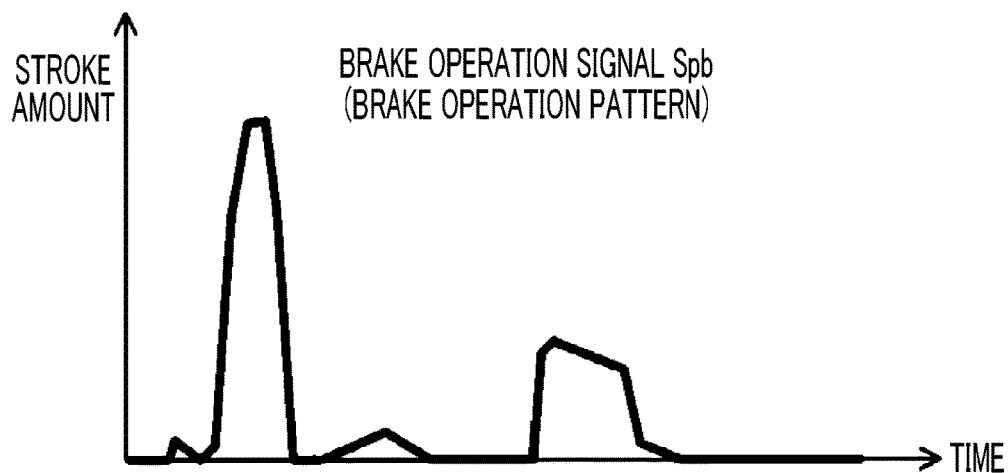
FIG. 2B is a graph showing a brake operation pattern.

Hereinafter, the difference between the accelerator operation pattern and the brake operation pattern will be described referring to FIGS. 2A and 2B. FIG. 2A is a graph showing an accelerator operation pattern. FIG. 2B is a graph showing a brake operation pattern. In FIG. 2A, an accelerator operation signal Spa indicates "a stroke amount (that is, a stepping amount of the accelerator pedal 11) of the accelerator pedal 11" that is an example of a parameter indicating the operation content of the accelerator pedal 11. Accordingly, the accelerator operation pattern corresponds to a change pattern of the stroke amount of the accelerator pedal 11 along a time axis. However, the accelerator operation signal Spa may indicate a predetermined parameter (for example, the magnitude of the stepping force of the accelerator pedal 11, a stepping speed of the accelerator pedal 11, or the like) indicating the operation content of the accelerator pedal 11. Similarly, in FIG. 2B, the brake operation signal Spb indicates "a stroke amount (that is, a stepping amount of the brake pedal 12) of the brake pedal 12" that is an example of a parameter indicating the operation content of the brake pedal 12. Accordingly, the brake operation pattern corresponds to a change pattern of the stroke amount of the brake pedal 12 along a time axis. However, the brake operation signal Spb may indicate a predetermined parameter (for example, the magnitude of the stepping force of the brake pedal 12, a stepping speed of the brake pedal 12, or the like) indicating the operation content of the brake pedal 12.

As shown in FIGS. 2A and 2B, for example, there is the difference between the accelerator operation pattern and the brake operation pattern that the accelerator pedal 11 is relatively slowly stepped, while the brake pedal 12 is relatively rapidly stepped. That is, there is the difference between the accelerator operation pattern and the brake operation pattern that the stroke amount relatively slowly increases or decreases in the accelerator operation pattern, while the stroke amount relatively rapidly increases or decreases in the brake operation pattern. In addition, for example, there is the difference between the accelerator operation pattern and the brake operation pattern that the accelerator pedal 11 is hardly relatively deeply stepped, while the brake pedal 12 is easily relatively deeply stepped. That is, there is the difference between the accelerator operation pattern and the brake operation pattern that the maximum value of the stroke amount is relatively small in the accelerator operation pattern, while the maximum value of the stroke amount is relatively large in the brake operation pattern. In addition, for example, there is the difference between the accelerator operation pattern and the brake operation pattern that the accelerator pedal 11 is continued to be stepped over a relatively long period, while the brake pedal 12 is stepped solely in a relatively short period. That is, there is the difference between the accelerator operation pattern and the brake operation pattern that a period during which the stroke amount becomes greater than zero is relatively long in the accelerator operation pattern, while a period during which the stroke amount becomes greater than zero is relatively short in the brake operation pattern.

The operation determination ECU 17 determines whether or not the occupant performs the erroneous operation by determining whether an actual operation pattern (that is, the time-series pattern of the operation content of the accelerator pedal 11) indicated by the accelerator operation signal Spa input to the operation determination ECU 17 is the accelerator operation pattern (that is, corresponds to, for example, identical or similar to the accelerator operation pattern) or the brake operation pattern. That is, the operation determination ECU 17 determines whether or not the occupant performs the erroneous operation by determining whether the actual operation pattern corresponds to (for example, identical or similar to) the accelerator operation pattern or the brake operation pattern. In a case where the actual operation pattern is the accelerator operation pattern (that is, corresponds to the accelerator operation pattern), the operation determination ECU 17 determines that the occupant does not perform an erroneous operation. In a case where the actual operation pattern is the brake operation pattern (that is, corresponds to the brake operation pattern), the operation determination ECU 17 determines that the occupant performs an erroneous operation.

In the embodiment, in particular, the operation determination ECU 17 learns the accelerator operation signal Spa and the brake operation signal Spb so as to further improve the determination accuracy about whether or not the occupant performs the erroneous operation. Hereinafter, the configuration and operation of the operation determination ECU 17 that determines whether or not the occupant performs the erroneous operation and learns the accelerator operation signal Spa and the brake operation signal Spb will be described in order.

(2) Operation Determination ECU 17

(2-1) Configuration of Operation Determination ECU 17

Figure 3:
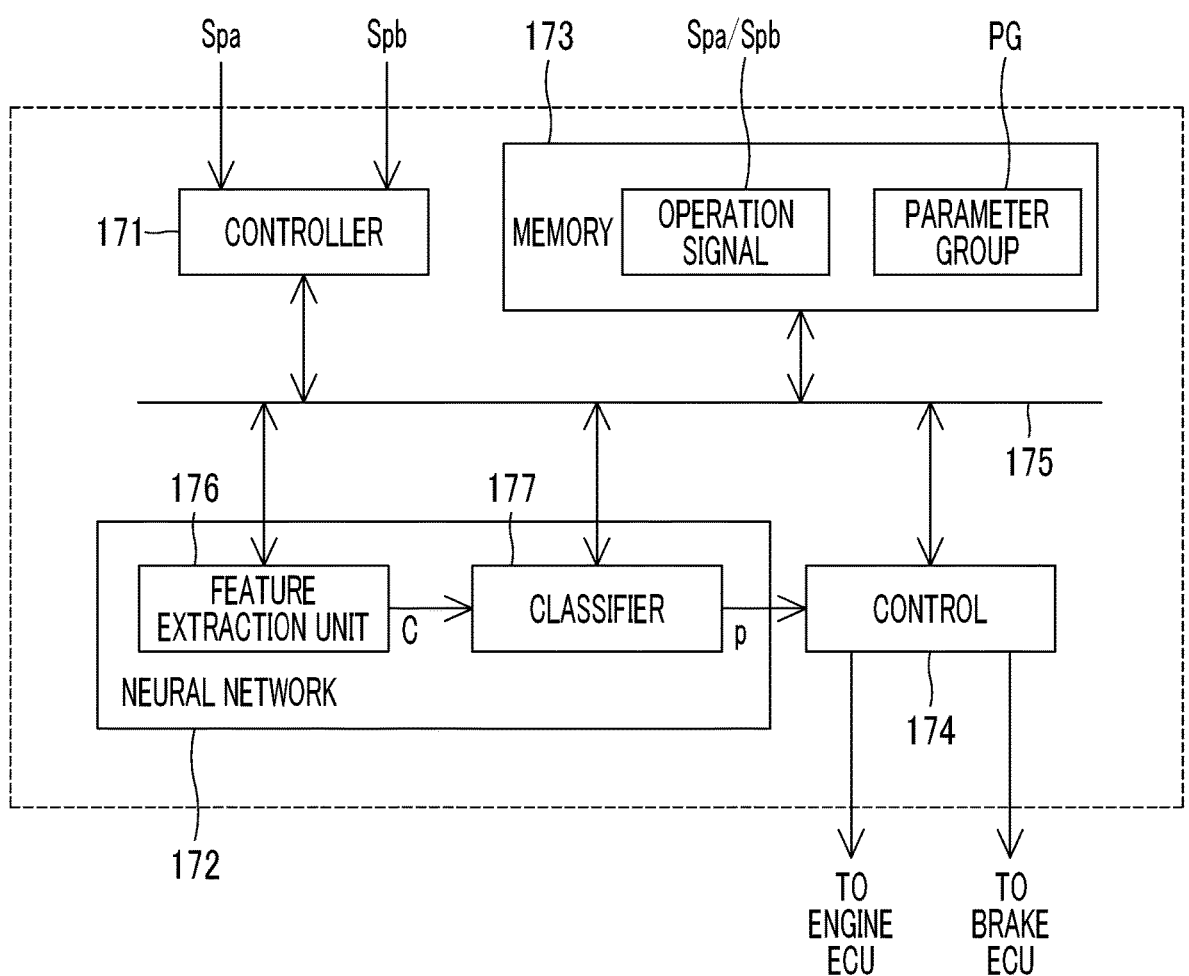
FIG. 3 is a block diagram showing the configuration of an operation determination ECU.

First, the configuration of the operation determination ECU 17 will be described referring to FIG. 3. FIG. 3 is a block diagram showing the configuration of the operation determination ECU 17.

As shown in FIG. 3, the operation determination ECU 17 includes a controller 171 and a neural network 172 that is a specific example of an "electronic control unit", a memory 173, and a control 174 as processing blocks logically implemented in the operation determination ECU 17 or processing circuits physically implemented in the operation determination ECU 17. The controller 171, the neural network 172, the memory 173, and the control 174 can perform communication through a data bus 175.

The controller 171 performs control of the entire operation of the operation determination ECU 17. In particular, the controller 171 acquires the accelerator operation signal Spa from the accelerator pedal 11 and acquires the brake operation signal Spb from the brake pedal 12. The controller 171 outputs the acquired accelerator operation signal Spa and brake operation signal Spb to the neural network 172. The controller 171 may store the acquired accelerator operation signal Spa and brake operation signal Spb in the memory 173.

The neural network 172 determines whether or not the occupant performs the erroneous operation based on the input accelerator operation signal Spa. Specifically, the neural network 172 calculates a probability p that the actual operation pattern indicated by the accelerator operation signal Spa is the brake operation pattern (or a probability that the actual operation pattern is the accelerator operation pattern). In other words, the neural network 172 calculates similarity of the actual operation pattern to the brake operation pattern (similarity to the accelerator operation pattern). In order to calculate the probability p (in other words, similarity; the same applies to the following), the neural network 172 includes a feature extraction unit 176 that calculates a feature quantity vector C indicating a feature of the actual operation pattern, and a classifier 177 that calculates the probability p based on the feature quantity vector C. Note that details of the feature extraction unit 176 and the classifier 177 will be described in describing the operation of the operation determination ECU 17, and thus, description thereof will be omitted.

The neural network 172 learns the input accelerator operation signal Spa and brake operation signal Spb. In particular, in order to adjust a parameter group PG including a plurality of parameters defining the characteristics of the classifier 177 to further improve calculation accuracy of the probability p, the neural network 172 learns the input accelerator operation signal Spa and brake operation signal Spb. The parameter group PG adjusted by the neural network 172 is stored in the memory 173.

The control 174 performs control of the engine ECU 13 and the brake ECU 14 based on the probability p calculated by the neural network 172. Note that details of the operation of the control 174 will be described in describing the operation of the operation determination ECU 17, and thus, description thereof will be omitted.

(2-2) Operation of Operation Determination ECU 17

(2-2-1) Initial Learning of Neural Network 172

First, in mounting the operation determination ECU 17 in the vehicle 1 (in other words, before the vehicle 1 puts on the market), initial learning of the neural network 172 is performed. Specifically, first, a plurality of accelerator operation patterns and brake operation patterns are collected by the controller 171. The accelerator operation patterns may be collected when a test driver actually operates the accelerator pedal 11. The accelerator operation patterns may be collected from a simulation model that simulates motion of the occupant who steps on the accelerator pedal 11. The brake operation patterns may be collected when the test driver actually operates the brake pedal 12. The brake operation patterns may be collected from a simulation model that simulates motion of the occupant who steps on the brake pedal 12.

The controller 171 associates the collected accelerator operation patterns and brake operation patterns with correct answer data indicating whether each operation pattern is an accelerator operation pattern or a brake operation pattern. Specifically, for example, the controller 171 associates a plurality of accelerator operation patterns $(x_{a1}, x_{a2}, \ldots, x_{aN})$ with correct answer data $(t_{a1}, t_{a2}, \ldots, t_{aN})$ indicating that each of the accelerator operation patterns $(x_{a1}, x_{a2}, \ldots, x_{aN})$ is an accelerator operation pattern. Note that N indicates the total number of collected accelerator operation patterns, $x_{an}$ (where n is an integer satisfying $1 \leq n \leq N$) indicates an n-th accelerator operation pattern (that is, time-series data of the stroke amount), and $t_{an}$ indicates correct answer data indicating that an accelerator operation pattern $x_{an}$ is an accelerator operation pattern. In addition, for example, the controller 171 associates a plurality of brake operation patterns $(x_{b1}, x_{b2}, \ldots, x_{bM})$ with correct answer data $(t_{b1}, t_{b2}, \ldots, t_{bM})$ indicating that each of the brake operation patterns $(x_{b1}, x_{b2}, \ldots, x_{bM})$ is a brake operation pattern. Note that M indicates the total number of collected brake operation patterns, $x_{bm}$ (where m is an integer satisfying 1≤m≤M) indicates an m-th brake operation pattern (that is, time-series data of the stroke amount), and $t_{bm}$ indicates correct answer data indicating that a brake operation pattern $x_{bm}$ is a brake operation pattern.

Thereafter, the controller 171 generates a matrix (x, t) in which the accelerator operation patterns $(x_{a1}, x_{a2}, \ldots, x_{aN})$, the correct answer data $(t_{a1}, t_{a2}, \ldots, t_{aN})$, the brake operation patterns $(x_{b1}, x_{b2}, \ldots, x_{bM})$, and the correct answer data $(t_{b1}, t_{b2}, \ldots, t_{bM})$ are linked. Note that x is a matrix obtained by linking the accelerator operation patterns $(x_{a1}, x_{a2}, \ldots, x_{aN})$ and the brake operation patterns $(x_{b1}, x_{b2}, \ldots, x_{bM})$, and is expressed by a matrix $(x_{a1}, x_{a2}, \ldots, x_{aN}, x_{b1}, x_{b2}, \ldots, x_{bM})$. Similarly, t is a matrix obtained by linking the correct answer data $(t_{a1}, t_{a2}, \ldots, t_{aN})$ and the correct answer data $(t_{b1}, t_{b2}, \ldots, t_{bM})$, and is expressed by a matrix $(t_{a1}, t_{a2}, \ldots, t_{aN}, t_{b1}, t_{b2}, \ldots, t_{bM})$. Accordingly, the matrix (x, t) becomes a matrix indicating whether each matrix component (that is, the operation pattern) of the matrix x is an accelerator operation pattern or a brake operation pattern.

Thereafter, learning of the neural network 172 is performed using the matrix (x, t) under the control of the controller 171. Specifically, a matrix component $x_{a1}$ constituting the matrix x is input to the feature extraction unit 176. The feature extraction unit 176 calculates a feature quantity vector $C_{a1}$ indicating a feature quantity of the matrix component $x_{a1}$. The feature extraction unit 176 calculates the feature quantity vector $C_{a1}$ using an existing algorithm for extracting a feature quantity. However, for convenience of description, in the embodiment, the feature extraction unit 176 calculates the feature quantity vector $C_{a1}$ by performing convolution processing on the matrix component $x_{a1}$. That is, in the embodiment, the neural network 172 is a convolutional neural network (CNN).

Figure 4:
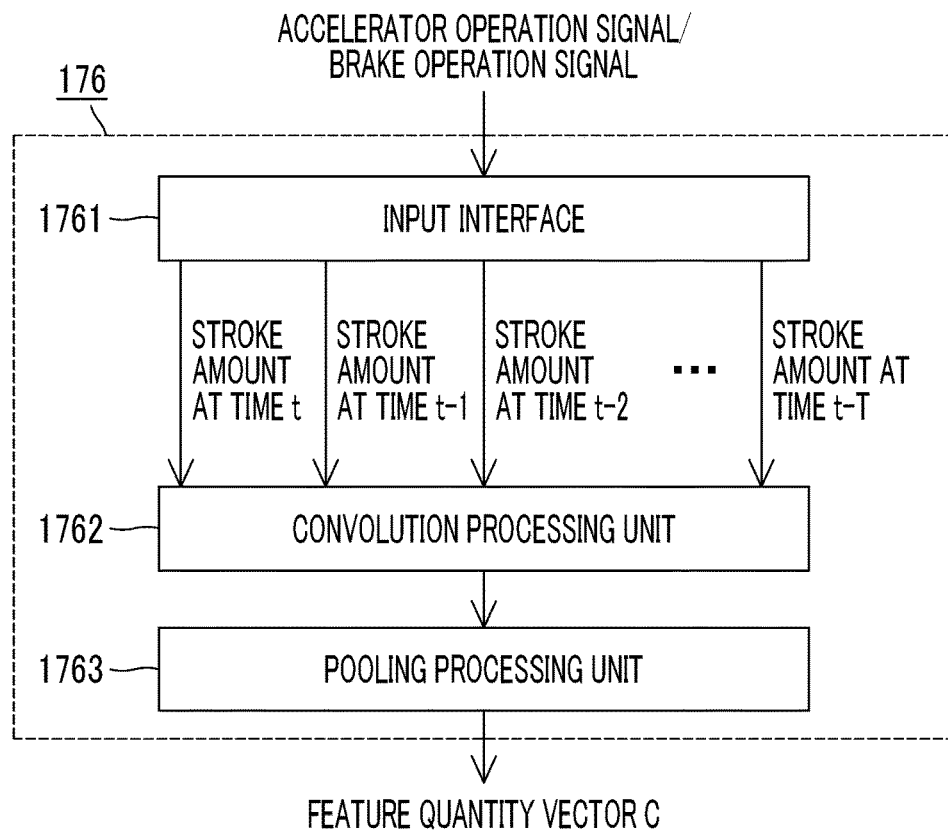
FIG. 4 is a block diagram showing the configuration of a feature extraction unit.

In the above-described case, as shown in FIG. 4, the feature extraction unit 176 includes an input interface 1761, a convolution processing unit 1762, and a pooling processing unit 1763. Note that convolution processing performed by the convolution processing unit 1762 may be the same as existing convolution processing, and pooling processing performed by the pooling processing unit 1763 may be the same as existing pooling processing. For this reason, for simplification of description, while detailed description of the convolution processing and the pooling processing will not be provided, the outline of the convolution processing and the pooling processing will be hereinafter described simply. The matrix component $x_{a1}$ (that is, the accelerator operation signal Spa or the brake operation signal Spb) is input to the input interface 1761. The input interface 1761 converts the matrix component $x_{a1}$ having a serial data array to a parallel data array. The input interface 1761 inputs the matrix component $x_{a1}$ having a parallel data array to the convolution processing unit 1762. The convolution processing unit 1762 performs the convolution processing on the matrix component $x_{a1}$ using a convolution filter having a desired filter characteristic. At this time, the convolution processing unit 1762 may perform a plurality of kinds of convolution processing on the matrix component $x_{a1}$ using a plurality of convolution filters having different filter characteristics or may perform convolution processing using a single convolution filter. Data (so-called feature map) obtained as a result of the convolution processing is input to the pooling processing unit 1763. The pooling processing unit 1763 performs the pooling processing on the feature map. As a result, the pooling processing unit 1763 outputs a D-dimensional (where D is an integer equal to or greater than one) feature quantity vector $C_{a1}$ indicating the feature of the matrix component $x_{a1}$.

In the example shown in FIG. 4, the feature extraction unit 176 includes a single processing unit including the convolution processing unit 1762 and the pooling processing unit 1763. However, the feature extraction unit 176 may include a plurality of processing units including the convolution processing unit 1762 and the pooling processing unit 1763. In this case, the feature quantity vector $C_{a1}$ output from the pooling processing unit 1763 of a certain processing unit is output to the convolution processing unit 1762 of a processing unit of the next stage. That is, the convolution processing and the pooling processing are repeatedly performed.

The feature quantity vector $C_{a1}$ calculated by the feature extraction unit 176 is input to the classifier 177. The classifier 177 classifies the operation pattern indicated by the matrix component $x_{a1}$ into one of two classes based on the feature quantity vector $C_{a1}$. That is, the classifier 177 determines to which of the two classes the operation pattern indicated by the matrix component $x_{a1}$ belongs. Accordingly, the classifier 177 is a two-class classification type classifier. Here, as described above, the neural network 172 calculates the probability p that the actual operation pattern indicated by the input accelerator operation signal Spa is a brake operation pattern. For this reason, the classifier 177 is configured to calculate a probability $p_{a1}$ that the operation pattern indicated by the matrix component $x_{a1}$ is a brake operation pattern. That is, the classifier 177 classifies the operation pattern indicated by the matrix component $x_{a1}$ into one of a class corresponding to an accelerator operation pattern and a class corresponding to a brake operation pattern by calculating the probability $p_{a1}$.

Figure 5:
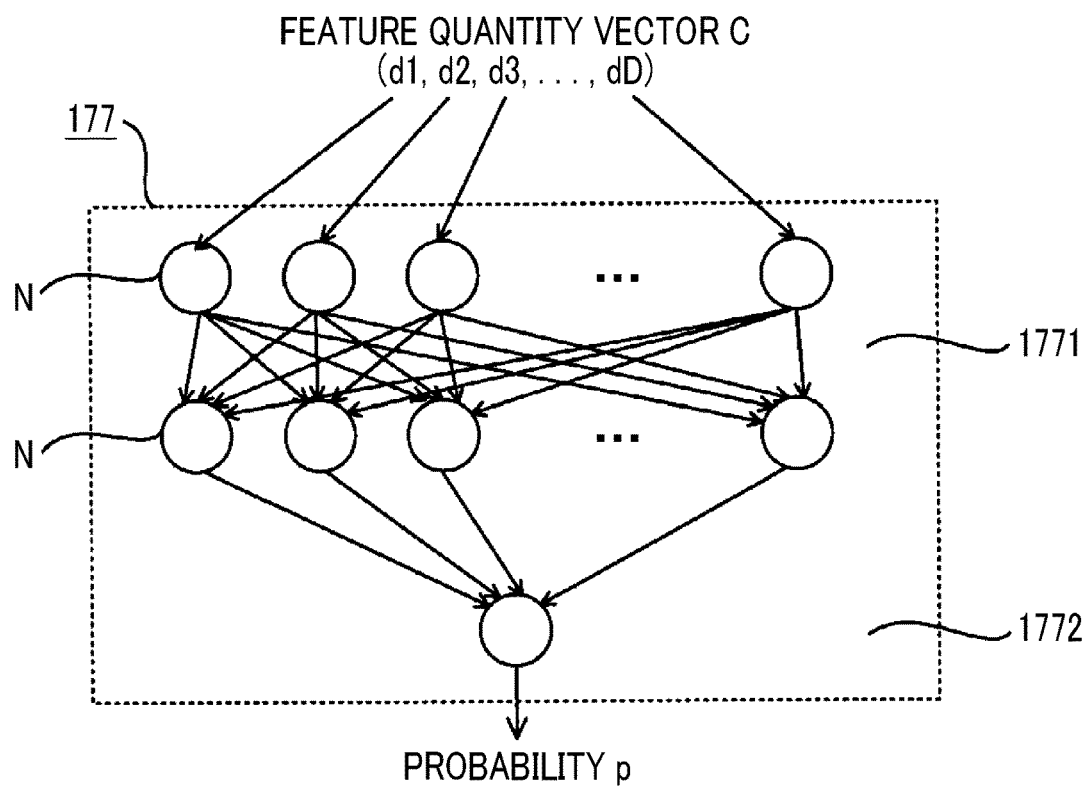
FIG. 5 is a block diagram showing the configuration of a classifier.

For example, as shown in FIG. 5, the classifier 177 described above includes a fully connected layer 1771 to which D input values (d1, d2, d3, . . . , dD) constituting the D-dimensional feature quantity vector C are input, and an output layer 1772 that outputs the probability p based on an output from the fully connected layer 1771.

The above-described calculation operation of the probability p is performed on others matrix components $x_{a2}, \ldots, x_{aN}, x_{b1}, x_{b2}, \ldots, x_{bM}$ constituting the matrix x. As a result, a probability $p_{a2}$ that an operation pattern indicated by the matrix component $x_{a2}$ is a brake operation pattern, . . . , a probability $p_{aN}$ that an operation pattern indicated by the matrix component $x_{aN}$ is a brake operation pattern, a probability $p_{b1}$ that an operation pattern indicated by the matrix component $x_{b1}$ is a brake operation pattern, . . . , and a probability $p_{bM}$ that an operation pattern indicated by the matrix component $x_{bM}$ is a brake operation pattern are calculated.

Thereafter, the controller 171 calculates an error function E(p,t) indicating an error between the probability $p(=(p_{a1}, p_{a2}, \ldots, p_{aN}, p_{b1}, \ldots, p_{bM}))$ calculated by the classifier 177 and the correct answer data $t(=(t_{a1}, t_{a2}, \ldots, t_{aN}, t_{b1}, \ldots, t_{bM}))$. Thereafter, the controller 171 subjects the feature extraction unit 176 and the classifier 177 to learning such that the error function E(p,t) is minimized. That is, the controller 171 subjects the feature extraction unit 176 and the classifier 177 to learning using a supervised learning algorithm. In this case, since the feature extraction unit 176 and the classifier 177 constitute the neural network 172, the controller 171 may subject the feature extraction unit 176 and the classifier 177 to learning using an error inverse propagation method. However, the controller 171 may subject the feature extraction unit 176 and the classifier 177 to learning using other algorithms. Note that, since a probability that a certain operation pattern is a brake operation pattern is the probability p, each of the correct answer data $t_{a1}, t_{a2}, \ldots, t_{aN}$ indicates "0(=0%)", and each of the correct answer data $t_{b1}, t_{b2}, \ldots, t_{bM}$ indicates "1(=100%)". Furthermore, since an existing error function (in other words, a loss function or an objective function) may be used as the error function E(p,t), detailed description of the error function E(p,t) will be omitted.

Learning of the feature extraction unit 176 may include adjustment of the filter characteristic of the convolution filter used by the feature extraction unit 176. Information indicating the adjusted filter characteristic is stored in the memory 173 as a parameter constituting the parameter group PG. However, the learning of the feature extraction unit 176 may include adjustment of a predetermined characteristic (in particular, a characteristic related to calculation of the feature quantity vector C) of the feature extraction unit 176. Learning of the classifier 177 may include adjustment of weights of a plurality of nodes N constituting the fully connected layer 1771. The learning of the classifier 177 may include adjustment of an activation function (so-called softmax function) used in the output layer 1772. Information indicating the adjusted weights of the nodes N and the activation function is stored in the memory 173 as a parameter constituting the parameter group PG. However, the learning of the classifier 177 may include adjustment of a predetermined characteristic (in particular, a characteristic related to calculation of the probability p) of the classifier 177.

Figure 6A:
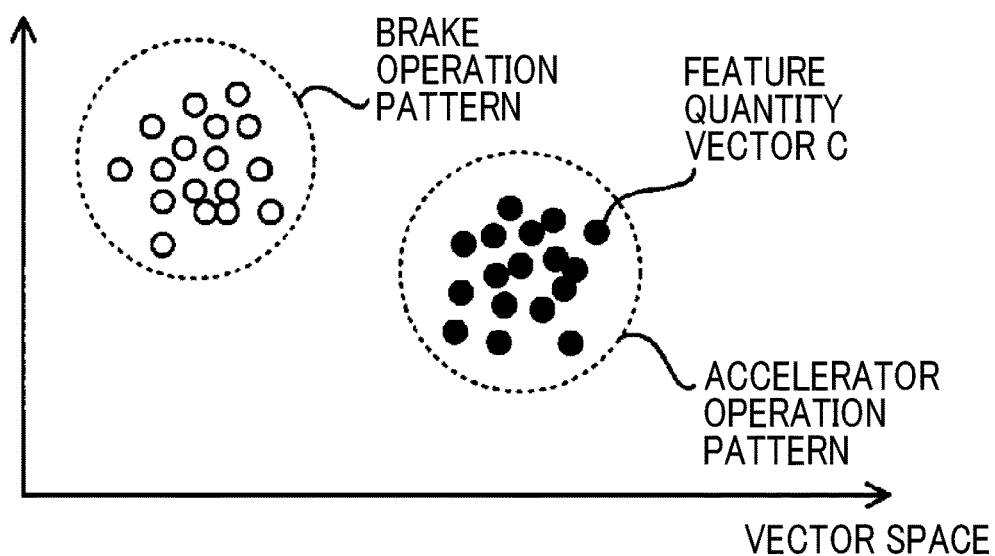
FIG. 6A is a graph showing a feature quantity vector calculated by the feature extraction unit on a space corresponding to the feature quantity vector.
Figure 6B:
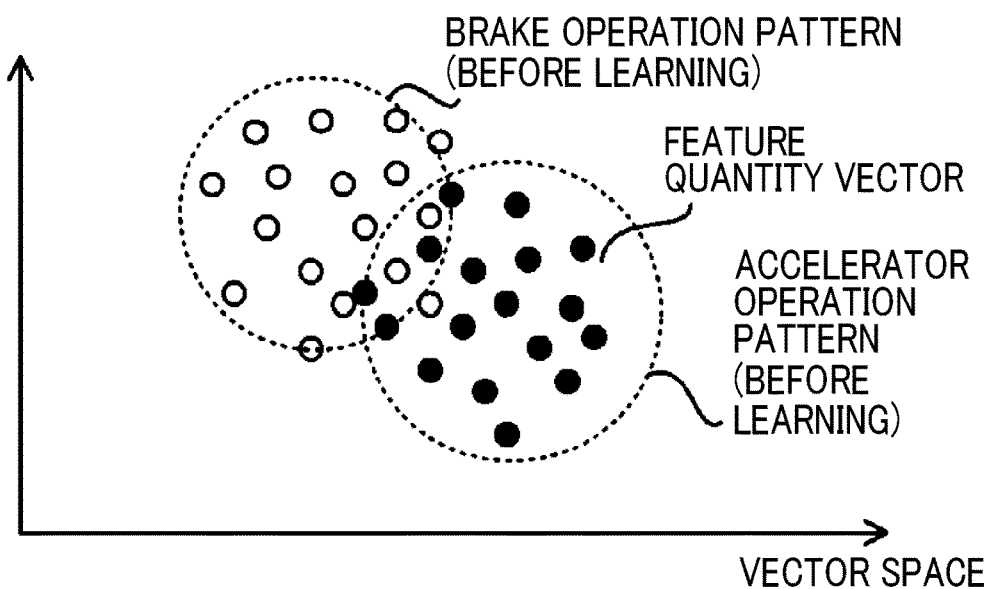
FIG. 6B is a graph showing the feature quantity vector calculated by the feature extraction unit on the space corresponding to the feature quantity vector.

When the learning of the feature extraction unit 176 is performed such that the error function E(p,t) described above is minimized, as shown in FIG. 6A, the feature extraction unit 176 can calculate the feature quantity vector C such that the feature quantity vector C corresponding to the accelerator operation pattern and the feature quantity vector C corresponding to the brake operation pattern are clearly separated in a D-dimensional space corresponding to the feature quantity vector C. Conversely, the learning of the feature extraction unit 176 is performed such that the feature quantity vector C capable of clearly separating the feature quantity vector C corresponding to the accelerator operation pattern and the feature quantity vector C corresponding to the brake operation pattern can be calculated. As a result, in the feature quantity vector C calculated by the feature extraction unit 176 before learning, as shown in FIG. 6B, even in a case where the feature quantity vector C corresponding to the accelerator operation pattern and the feature quantity vector C corresponding to the brake operation pattern overlap at least partially, the feature quantity vector C can be calculated by learning such that the feature quantity vector C corresponding to the accelerator operation pattern and the feature quantity vector C corresponding to the brake operation pattern are clearly separated.

In addition, when the classifier 177 is subjected to learning such that the error function E(p,t) described above is minimized, as shown in FIG. 7, the classifier 177 can specify a hyperplane (that is, a determination boundary) for separating the feature quantity vector C corresponding to the accelerator operation pattern and the feature quantity vector C corresponding to the brake operation pattern in the D-dimensional space corresponding to the feature quantity vector C. That is, learning (that is, adjustment of the nodes N constituting the fully connected layer 1771 described above or adjustment of the activation function used in the output layer 1772) of the classifier 177 is equivalent to adjustment of the hyperplane corresponding to a calculation criterion in calculating the probability p that the actual operation pattern is the brake operation pattern. Accordingly, it can be said that the parameter group PG stored in the memory 173 substantially includes a parameter defining the hyperplane described above. In particular, since the feature quantity vector C corresponding to the accelerator operation pattern and the feature quantity vector C corresponding to the brake operation pattern are clearly separated by the learning of the feature extraction unit 176, the classifier 177 can specify the hyperplane defined at a position apart from both of the feature quantity vector C corresponding to the accelerator operation pattern and the feature quantity vector C corresponding to the brake operation pattern. For this reason, there is a relatively high possibility that the probability p output from the classifier 177 becomes a value close to zero or a value close to one (in other words, there is a relatively high possibility that the probability p becomes a value close to 0.5).

(2-2-2) Erroneous Operation Determination Operation by Operation Determination ECU 17

Subsequently, an erroneous operation determination operation that is performed by the operation determination ECU 17 in a period during which the vehicle 1 is actually traveling (that is, the occupant is actually operating the accelerator pedal 11) will be described referring to FIG. 3 again.

In this case, the accelerator operation signal Spa is input to the feature extraction unit 176. Thereafter, the feature extraction unit 176 calculates the feature quantity vector C indicating the feature of the accelerator operation signal Spa (that is, the feature quantity vector C indicating the feature of the actual operation pattern). The calculation operation of the feature quantity vector C in the erroneous operation determination operation is the same as the calculation operation of the feature quantity vector C in the initial learning.

Thereafter, the classifier 177 calculates the probability p that the actual operation pattern indicated by the input accelerator operation signal Spa is the brake operation pattern based on the feature quantity vector C. The calculation operation of the probability p in the erroneous operation determination operation is the same as the calculation operation of the probability p in the initial learning.

In a case where the occupant does not misstep on the accelerator pedal 11 instead of the brake pedal 12, the actual operation pattern should be the accelerator operation pattern. This is because the occupant is operating the accelerator pedal 11 with intent to operate the accelerator pedal 11. For this reason, the classifier 177 classifies the feature quantity vector C calculated by the feature extraction unit 176 into the class corresponding to the accelerator operation pattern. That is, the classifier 177 calculates the probability p close to zero. Accordingly, the classifier 177 determines substantially that the occupant does not misstep on the accelerator pedal 11 instead of the brake pedal 12 by calculating the probability p close to zero. In a case where the occupant missteps on the accelerator pedal 11 instead of the brake pedal 12, the actual operation pattern should be the brake operation pattern. This is because the occupant is operating the accelerator pedal 11 with intent to operate the brake pedal 12. For this reason, the classifier 177 classifies the feature quantity vector C calculated by the feature extraction unit 176 into the class corresponding to the brake operation pattern. That is, the classifier 177 calculates the probability p close to one. Accordingly, the classifier 177 determines substantially that the occupant missteps on the accelerator pedal 11 instead of the brake pedal 12 by calculating the probability p close to one.

The probability p (that is, substantially, a determination result about whether or not the occupant missteps on the accelerator pedal 11 instead of the brake pedal 12) calculated by the classifier 177 is input to the control 174.

In a case where the probability p is comparatively close to one (for example, becomes equal to or greater than a first predetermined threshold (for example, a value equal to or greater than 0.5, and is 0.7, 0.8, 0.9, or the like)), the control 174 restricts the operation of the engine ECU 13. Specifically, the control 174 restricts the operation of the engine ECU 13 so as not to perform control of the engine 15 based on the accelerator operation signal Spa. For example, the control 174 restricts the operation of the engine ECU 13 such that the engine 15 does not output the drive power regardless of the accelerator operation signal Spa. In addition, the control 174 may perform the control of the brake ECU 14 so as to generate the braking force for decelerating or stopping the vehicle 1 in addition to restricting the operation of the engine ECU 13, or may perform the control of the brake ECU 14 so as to generate the braking force for decelerating or stopping the vehicle 1 instead of restricting the operation of the engine ECU 13. As a result, the brake mechanism 16 generates the braking force for decelerating or stopping the vehicle 1.

In a case where the probability p is comparatively close to zero (for example, smaller than a second predetermined threshold (for example, a value equal to or less than 0.5, and is 0.3, 0.2, 0.1, or the like)), the control 174 does not restrict the operation of the engine ECU 13. For this reason, the engine ECU 13 performs the control of the engine 15 based on the accelerator operation signal Spa.

An example of the control 174 capable of restricting the operation of the engine ECU 13 as described above will be described referring to FIG. 8. As shown in FIG. 8, the control 174 includes a binarization processing unit 1741, a switch 1742, and a latch 1743. The binarization processing unit 1741 binarizes the probability p. For example, the binarization processing unit 1741 converts the probability p comparatively close to one (for example, becomes equal to or greater than the above-described first predetermined threshold) to one, and converts the probability p comparatively close to zero (for example, becomes equal to or less than the above-described second predetermined threshold) to zero. The switch 1742 operates in a period during which the accelerator pedal 11 is operated, and is stopped in a period during which the brake pedal 12 is operated. For this reason, a pedal identification signal indicating whether the operation pedal that the occupant operates is the accelerator pedal 11 or the brake pedal 12 is input to the switch 1742. The switch 1742 is a multiplexer (MUX). Zero is input to a first input terminal of the switch 1742 (that is, the first input terminal of the switch 1742 is grounded), and an output of the binarization processing unit 1741 is input to a second input terminal of the switch 1742. Accordingly, as shown in FIG. 9, the switch 1742 outputs one in a period during which the occupant missteps on the accelerator pedal 11 instead of the brake pedal 12, and outputs zero not in a period during which the occupant missteps on the accelerator pedal 11 instead of the brake pedal 12. The latch 1743 outputs one in a case where an output of the switch 1742 becomes one, and resets the output to zero in a case where the output of the switch 1742 becomes zero.

The output of the latch 1743 is output to the engine ECU 13 and the brake ECU 14. In a case where the output of the latch 1743 is one, the brake ECU 14 performs control such that the brake mechanism 16 generates the braking force for performing at least one of restriction on the operation of the engine ECU 13 or deceleration or stop of the vehicle 1. In a case where the output of the latch 1743 is zero, the operation of the engine ECU 13 is not restricted.

Note that, in a case where the operation of the engine ECU 13 is restricted such that the engine 15 does not output the drive power, transmission of the accelerator operation signal Spa to the engine ECU 13 may be shut off based on the output of the latch 1743 in addition to that the output of the latch 1743 is input to the engine ECU 13 (that is, the operation of the engine ECU 13 is restricted directly based on the output of the latch 1743), or transmission of the accelerator operation signal Spa to the engine ECU 13 may be shut off based on the output of the latch 1743 instead of that the output of the latch 1743 is input to the engine ECU 13. Specifically, for example, a switch capable of shutting off transmission of the accelerator operation signal Spa may be disposed between the accelerator pedal 11 and the engine ECU 13, in a case where the output of the latch 1743 is one, a state of the switch is made to transition to a state in which transmission of the accelerator operation signal Spa can be shut off, and in a case where the output of the latch 1743 is zero, the state of the switch may be made to transition to a state in which transmission of the accelerator operation signal Spa is not shut off.

(2-2-3) Online Learning of Neural Network 172

In the embodiment, in addition, learning of the neural network 172 by the operation determination ECU 17 is performed using at least one of the accelerator operation signal Spa and the brake operation signal Spb input to the controller 171 in a period during which the vehicle 1 is actually traveling (that is, a period during which the occupant is actually operating the accelerator pedal 11). That is, online learning (in other words, real-time learning) of the neural network 172 is performed. Specifically, each time at least one of the accelerator operation signal Spa and the brake operation signal Spb is input to the neural network 172, learning of the neural network 172 is performed. However, each time a given amount of at least one of the accelerator operation signal Spa and the brake operation signal Spb is stored in the memory 173, learning of the neural network 172 may be performed.

The online learning of the neural network 172 includes learning of the classifier 177. In this case, the controller 171 may subject the classifier 177 to learning using a supervised learning algorithm. That is, the controller 171 may subject the classifier 177 to learning in the same learning mode as the initial learning. In this case, the correct answer data may be input by the occupant, for example. Alternatively, the controller 171 may subject the classifier 177 to learning using an unsupervised learning algorithm. As an example of the unsupervised learning algorithm, an expectation maximization (EM) method or the like is exemplified. The online learning of the neural network 172 may include the learning of the feature extraction unit 176 in addition to the learning of the classifier 177 or may include the learning of the feature extraction unit 176 instead of the learning of the classifier 177. In this case, the controller 171 may subject the feature extraction unit 176 to learning using at least one of the supervised learning algorithm and the unsupervised learning algorithm. However, since a processing load needed for the learning of the feature extraction unit 176 may be greater than a processing load needed for the learning of the classifier 177, for the purpose of further reducing a processing load needed for learning, the learning (that is, online learning) of the feature extraction unit 176 may not be performed.

The online learning of the neural network 172 may be performed in the operation determination ECU 17. Alternatively, the online learning of the neural network 172 may be performed by a data center outside the vehicle 1. In this case, at least one of the accelerator operation signal Spa and the brake operation signal Spb is transmitted from the vehicle 1 to the data center through a network. In the data center, a calculation model equivalent to the neural network 172 is constructed. The data center simulates the learning of the neural network 172 using at least one of the accelerator operation signal Spa and the brake operation signal Spb and the calculation model. A learning result by the data center is transmitted from the data center to the operation determination ECU 17 through the network. The operation determination ECU 17 adjusts the characteristic (that is, parameter group PG) of the neural network 172 based on the learning result by the data center.

(3) Technical Effects

With the operation determination ECU 17 described above, the learning of the neural network 172 using the accelerator operation pattern and the brake operation pattern (that is, the accelerator operation signal Spa and the brake operation signal Spb) is performed. That is, the operation determination ECU 17 can appropriately determine whether or not the actual operation pattern is the brake operation pattern (that is, whether or not the occupant performs an erroneous operation) using the learning results of the accelerator operation pattern and the brake operation pattern. For this reason, the determination accuracy about whether or not the occupant performs an erroneous operation is further improved compared to the operation determination ECU 17 of the comparative example that does not learn the accelerator operation pattern and the brake operation pattern.

In particular, in the embodiment, the online learning of the neural network 172 is performed even while the vehicle 1 is traveling. That is, the neural network 172 is optimized according to an actual operation content of at least one of the accelerator pedal 11 and the brake pedal 12 by the occupant. For this reason, even in a case where the operation contents of the accelerator pedal 11 and the brake pedal 12 vary for each occupant due to the level of driving skill, or the like, the operation determination ECU 17 can appropriately determine whether or not the occupant performs an erroneous operation. Alternatively, even in a case where the operation contents of the accelerator pedal 11 and the brake pedal 12 vary depending on a difference in physical condition, feeling, or the like (or other factors) of the occupant, the operation determination ECU 17 can appropriately determine whether or not the occupant performs an erroneous operation.

Figure 10A:
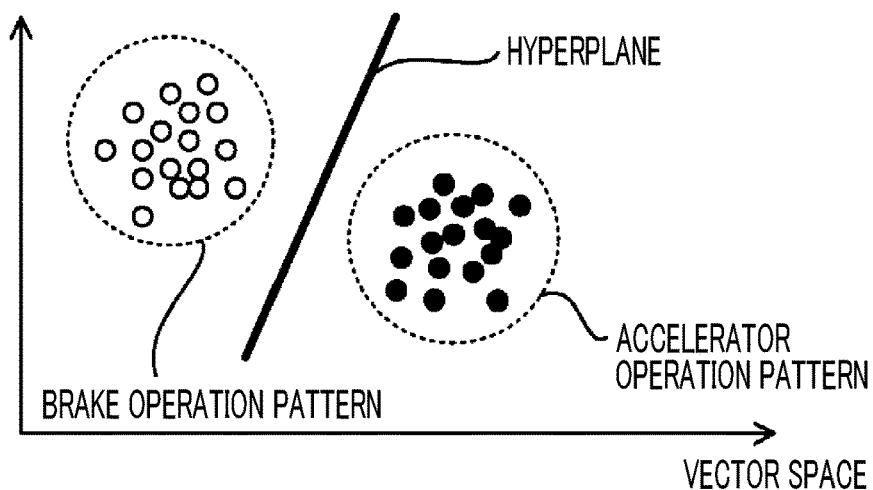
FIG. 10A is a graph showing variation of an accelerator operation pattern and a brake operation pattern of each occupant or due to the difference in physical condition or the like of the occupant using the feature quantity vector.
Figure 10B:
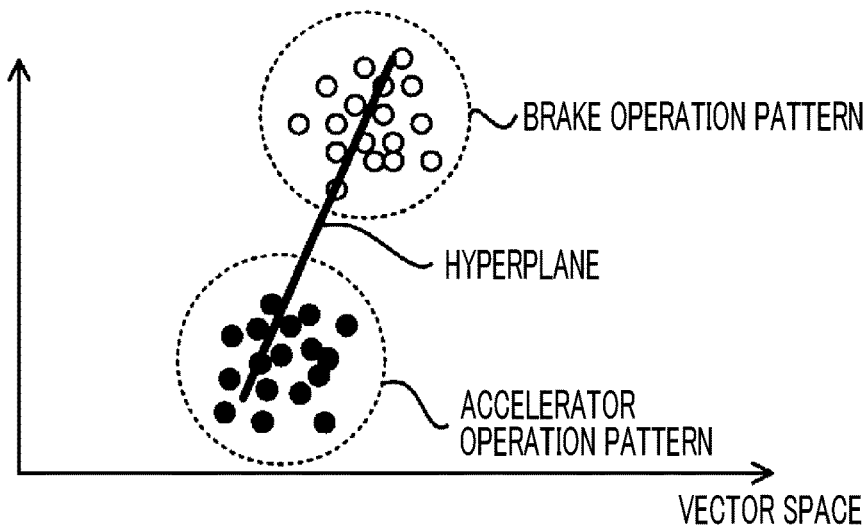
FIG. 10B is a graph showing variation of the accelerator operation pattern and the brake operation pattern of each occupant or due to the difference in physical condition or the like of the occupant using the feature quantity vector.
Figure 10C:
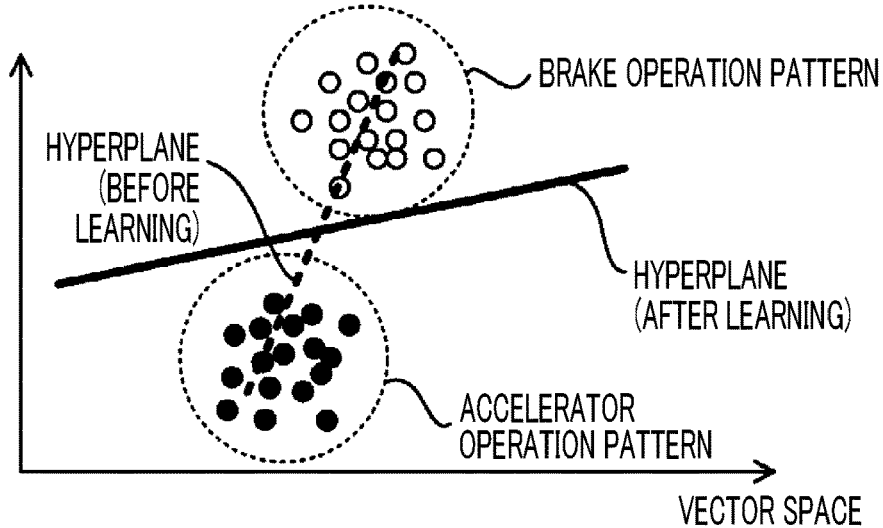
FIG. 10C is a graph schematically showing a mode of learning (that is, learning of a hyperplane) of a classifier in consideration of variation of the accelerator operation pattern and the brake operation pattern.

Specifically, for example, FIG. 10A is a graph showing a feature quantity vector C calculated in a case where a first occupant operates the accelerator pedal 11 and the brake pedal 12. FIG. 10B is a graph showing a feature quantity vector C calculated in a case where a second occupant different from the first occupant operates the accelerator pedal 11 and the brake pedal 12. A hyperplane shown in FIGS. 10A and 10B is a hyperplane specified by the initial learning of the neural network 172. As shown in FIGS. 10A and 10B, the operation contents of the accelerator pedal 11 and the brake pedal 12 may vary for each occupant due to the degree of driving skill, or the like. In this case, the hyperplane specified by the initial learning can clearly separate the feature quantity vector C corresponding to the accelerator operation pattern of the first occupant and the feature quantity vector C corresponding to the brake operation pattern of the first occupant. It cannot be said that the hyperplane specified by the initial learning can clearly separate the feature quantity vector C corresponding to the accelerator operation pattern of the second occupant and the feature quantity vector C corresponding to the brake operation pattern of the second occupant. In the situation described above, in a case where the online learning of the neural network 172 is performed while the second occupant is operating the vehicle 1, as shown in FIG. 10C, the hyperplane that can clearly separate the feature quantity vector C corresponding to the accelerator operation pattern of the second occupant and the feature quantity vector C corresponding to the brake operation pattern of the second occupant, and is optimized for the second occupant is defined. As a result, even in a case where the operation contents of the accelerator pedal 11 and the brake pedal 12 vary for each occupant due to the degree of driving skill, or the like, the operation determination ECU 17 can appropriately determine whether or not the occupant performs an erroneous operation.

Alternatively, for example, FIG. 10A may be a graph showing a feature quantity vector C calculated in a case where the occupant in a good physical condition operates the accelerator pedal 11 and the brake pedal 12. FIG. 10B may be a graph showing a feature quantity vector C calculated in a case where the same occupant in a poor physical condition operates the accelerator pedal 11 and the brake pedal 12. That is, FIGS. 10A and 10B may show that the operation contents of the accelerator pedal 11 and the brake pedal 12 may vary depending on the difference in physical condition or the like of the occupant. In this case, the hyperplane specified by the initial learning can clearly separate the feature quantity vector C corresponding to the accelerator operation pattern of the occupant in a good physical condition and the feature quantity vector C corresponding to the brake operation pattern of the occupant in a good physical condition. It cannot be said that the hyperplane specified by the initial learning can clearly separate the feature quantity vector C corresponding to the accelerator operation pattern of the occupant in a poor physical condition and the feature quantity vector C corresponding to the brake operation pattern of the occupant in a poor physical condition. In the condition described above, in a case where the online learning of the neural network 172 is performed while the occupant in a poor physical condition is operating the vehicle 1, as shown in FIG. 10C, the hyperplane that can separate the feature quantity vector C corresponding to the accelerator operation pattern of the occupant in a poor physical condition and the feature quantity vector C corresponding to the brake operation pattern of the occupant in a poor physical condition, and is optimized for the occupant in a poor physical condition is defined. As a result, even in a case where the operation contents of the accelerator pedal 11 and the brake pedal 12 vary depending on the difference in physical condition or the like of the occupant, the operation determination ECU 17 can appropriately determine whether or not the occupant performs an erroneous operation.

(4) MODIFICATION EXAMPLES

(4-1) First Modification Example

An accelerator operation pattern under a situation in which the vehicle 1 is moving forward may be different from an accelerator operation pattern under a situation in which the vehicle 1 is moving backward. Similarly, a brake operation pattern under a situation in which the vehicle 1 is moving forward may be different from a brake operation pattern under a situation in which the vehicle 1 is moving backward. In this case, in a case where the learning of the neural network 172 and the erroneous operation determination operation are performed without considering about whether the vehicle 1 is moving forward or backward, the determination accuracy about whether or not the occupant performs an erroneous operation may be deteriorated.

For this reason, in a first modification example, in the initial learning and the online learning, the neural network 172 separately learns the accelerator operation pattern (or the accelerator operation signal Spa) under a situation in which the vehicle 1 is moving forward and the accelerator operation pattern (or the accelerator operation signal Spa) under a situation in which the vehicle 1 is moving backward. In addition, the neural network 172 separately learns the brake operation pattern (or the brake operation signal Spb) under a situation in which the vehicle 1 is moving forward and the brake operation pattern (or the brake operation signal Spb) under a situation in which the vehicle 1 is moving backward.

Specifically, the feature extraction unit 176 separately adjusts a filter characteristic (hereinafter, referred to as a "filter characteristic for forward moving") used for calculating a feature quantity vector C from the accelerator operation signal Spa acquired under a situation in which the vehicle 1 is moving forward and a filter characteristic (hereinafter, referred to as a "filter characteristic for backward moving") used for calculating a feature quantity vector C from the accelerator operation signal Spa acquired under a situation in which the vehicle 1 is moving backward. That is, the feature extraction unit 176 adjusts the filter characteristic for forward moving based on the accelerator operation pattern (or the accelerator operation signal Spa) and the brake operation pattern (or the brake operation signal Spb) under a situation in which the vehicle 1 is moving forward. Similarly, the feature extraction unit 176 adjusts the filter characteristic for backward moving based on the accelerator operation pattern (or the accelerator operation signal Spa) and the brake operation pattern (or the brake operation signal Spb) under a situation in which the vehicle 1 is moving backward.

The classifier 177 separately adjusts a hyperplane (hereinafter, referred to as a "hyperplane for forward moving") used for calculating the probability p that the actual operation pattern is the brake operation pattern, acquired under a situation in which the vehicle 1 is moving forward and a hyperplane (hereinafter, referred to as a "hyperplane for backward moving") used for calculating the probability p that the actual operation pattern is the brake operation pattern, acquired under a situation in which the vehicle 1 is moving backward. That is, the classifier 177 adjusts the hyperplane for forward moving based on the accelerator operation pattern (or the accelerator operation signal Spa) and the brake operation pattern (or the brake operation signal Spb) under a situation in which the vehicle 1 is moving forward. Similarly, the classifier 177 adjusts the hyperplane for backward moving based on the accelerator operation pattern (or the accelerator operation signal Spa) and the brake operation pattern (or the brake operation signal Spb) under a situation in which the vehicle 1 is moving backward.

Figure 11A:
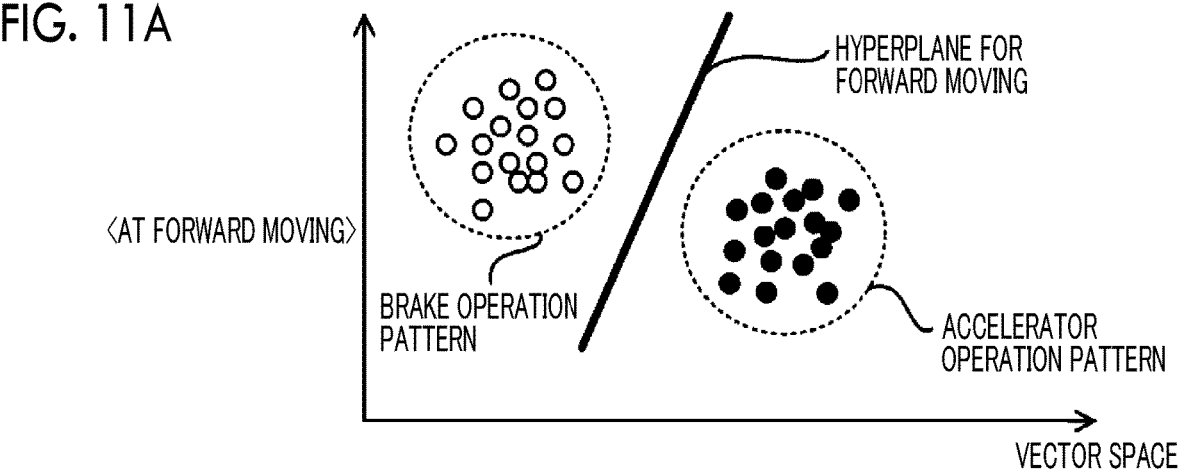
FIG. 11A is a graph showing an accelerator operation pattern and a brake operation pattern under a situation in which the vehicle is moving forward using the feature quantity vector.
Figure 11B:
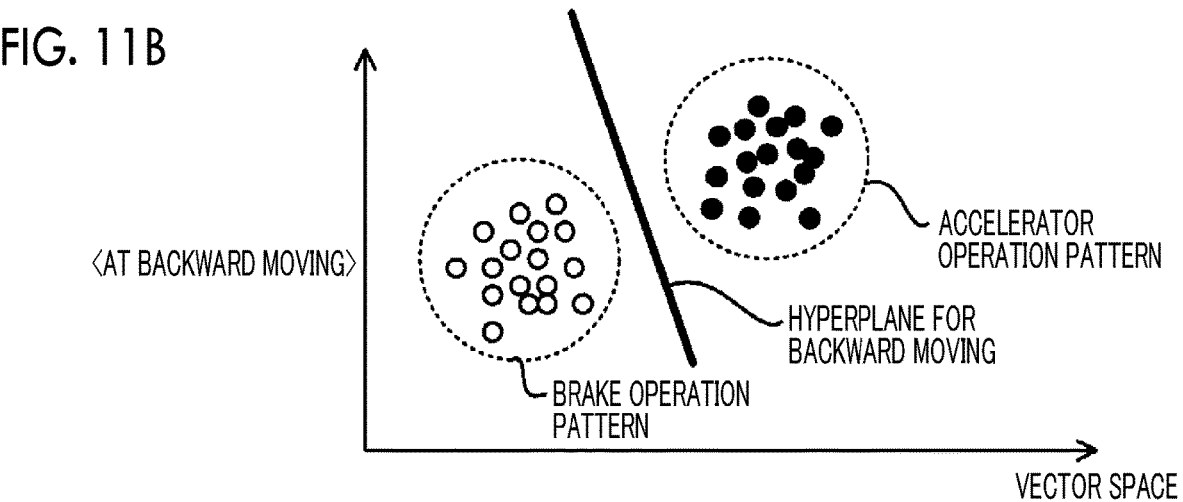
FIG. 11B is a graph showing an accelerator operation pattern and a brake operation pattern under a situation in which the vehicle is moving backward using the feature quantity vector.

In addition, in the erroneous operation determination operation, in a case where the vehicle 1 is moving forward, the feature extraction unit 176 calculates the feature quantity vector C using a convolution filter having the filter characteristic for forward moving. In a case where the vehicle 1 is moving backward, the feature extraction unit 176 calculates the feature quantity vector C using a convolution filter having the filter characteristic for backward moving. As a result, as shown in FIGS. 11A and 11B, the feature extraction unit 176 can calculate the feature quantity vector C such that the feature quantity vector C corresponding to the accelerator operation pattern and the feature quantity vector C corresponding to the brake operation pattern are separated clearly in both of a case where the vehicle 1 is moving forward and a case where the vehicle 1 is moving backward. That is, the feature extraction unit 176 can calculate the feature quantity vector C while considering the difference between the accelerator operation pattern and the brake operation pattern under a situation in which the vehicle 1 is moving forward and the accelerator operation pattern and the brake operation pattern under a situation in which the vehicle 1 is moving backward.

In the erroneous operation determination operation, in a case where the vehicle 1 is moving forward, as shown in FIG. 11A, the classifier 177 calculates the probability p using the hyperplane for forward moving. In a case where the vehicle 1 is moving backward, as shown in FIG. 11B, the classifier 177 calculates the probability p using the hyperplane for backward moving. That is, the classifier 177 can calculate the probability p while considering the difference between the accelerator operation pattern and the brake operation pattern under a situation in which the vehicle 1 is moving forward and the accelerator operation pattern and the brake operation pattern under a situation in which the vehicle 1 is moving backward.

In the first modification example described above, the operation determination ECU 17 can determine whether or not the occupant performs the erroneous operation under a situation in which the vehicle 1 is moving forward and whether or not the occupant performs the erroneous operation under a situation in which the vehicle 1 is moving backward with higher accuracy.

(4-2) Second Modification Example

The state of the occupant who is operating the accelerator pedal 11 may be different from the state of the occupant who is operating the brake pedal 12. For example, "force gripping a steering wheel of the occupant" that is a specific example of the state of the occupant has a characteristic that the force of gripping the steering wheel of the occupant who is operating the accelerator pedal 11 is relatively small, while the force of gripping the steering wheel of the occupant who is operating the brake pedal 12 becomes relatively large. This is because there is a relatively high possibility that the occupant grips the steering wheel tightly in order to step the brake pedal 12 relatively rapidly or deeply since the brake pedal 12 is stepped relatively rapidly or deeply as described above.

For this reason, it can be said that the state (in particular, a state that changes (in other words, distinguishable) between when the occupant is operating the accelerator pedal 11 and when the occupant is operating the brake pedal 12) of the occupant described above is beneficial information to the operation of determining whether or not the occupant performs an erroneous operation. Accordingly, in a second modification example, the operation determination ECU 17 determines whether or not the occupant performs an erroneous operation based on state information indicating the state of the occupant in addition to the accelerator operation signal Spa. Specifically, a sensor for detecting the state of the occupant is mounted in the vehicle 1. An output of the sensor is input to the feature extraction unit 176 like the accelerator operation signal Spa. The feature extraction unit 176 calculates a feature quantity vector C indicating a feature of information including the accelerator operation signal Spa and the state information. The classifier 177 calculates the probability p that the actual operation pattern indicated by the accelerator operation signal Spa is the brake operation pattern, from the feature quantity vector C.

In the second modification example, the neural network 172 also learns the state of the occupant in addition to the accelerator operation pattern (or the accelerator operation signal Spa) and the brake operation pattern (or the brake operation signal Spb). That is, the feature extraction unit 176 adjusts the filter characteristic using the state of the occupant in addition to the accelerator operation pattern (or the accelerator operation signal Spa) and the brake operation pattern (or the brake operation signal Spb). The classifier 177 adjusts the hyperplane using the state of the occupant in addition to the accelerator operation pattern (or the accelerator operation signal Spa) and the brake operation pattern (or the brake operation signal Spb). In the second modification example described above, the operation determination ECU 17 can determine whether or not the occupant performs the erroneous operation with higher accuracy.

(4-3) Third Modification Example

In the above description, the operation determination ECU 17 determines whether or not the occupant missteps on the accelerator pedal 11 instead of the brake pedal 12. Here, in order to determine whether or not the occupant missteps on the accelerator pedal 11 instead of the brake pedal 12, the operation determination ECU 17 calculates the probability p that the actual operation pattern indicated by the accelerator operation signal Spa is the brake operation pattern. It can be said that the above-described operation of calculating the probability p is substantially equivalent to an operation of specifying whether the occupant is about to operate the accelerator pedal 11 or the brake pedal 12. This is because, in a case where the probability p that the actual operation pattern is the brake operation pattern is relatively large, specification can be made that the occupant is about to operate the brake pedal 12, and in a case where the probability p that the actual operation pattern is the brake operation pattern is relatively small, specification can be made that the occupant is about to operate the accelerator pedal 11.

Figure 12:
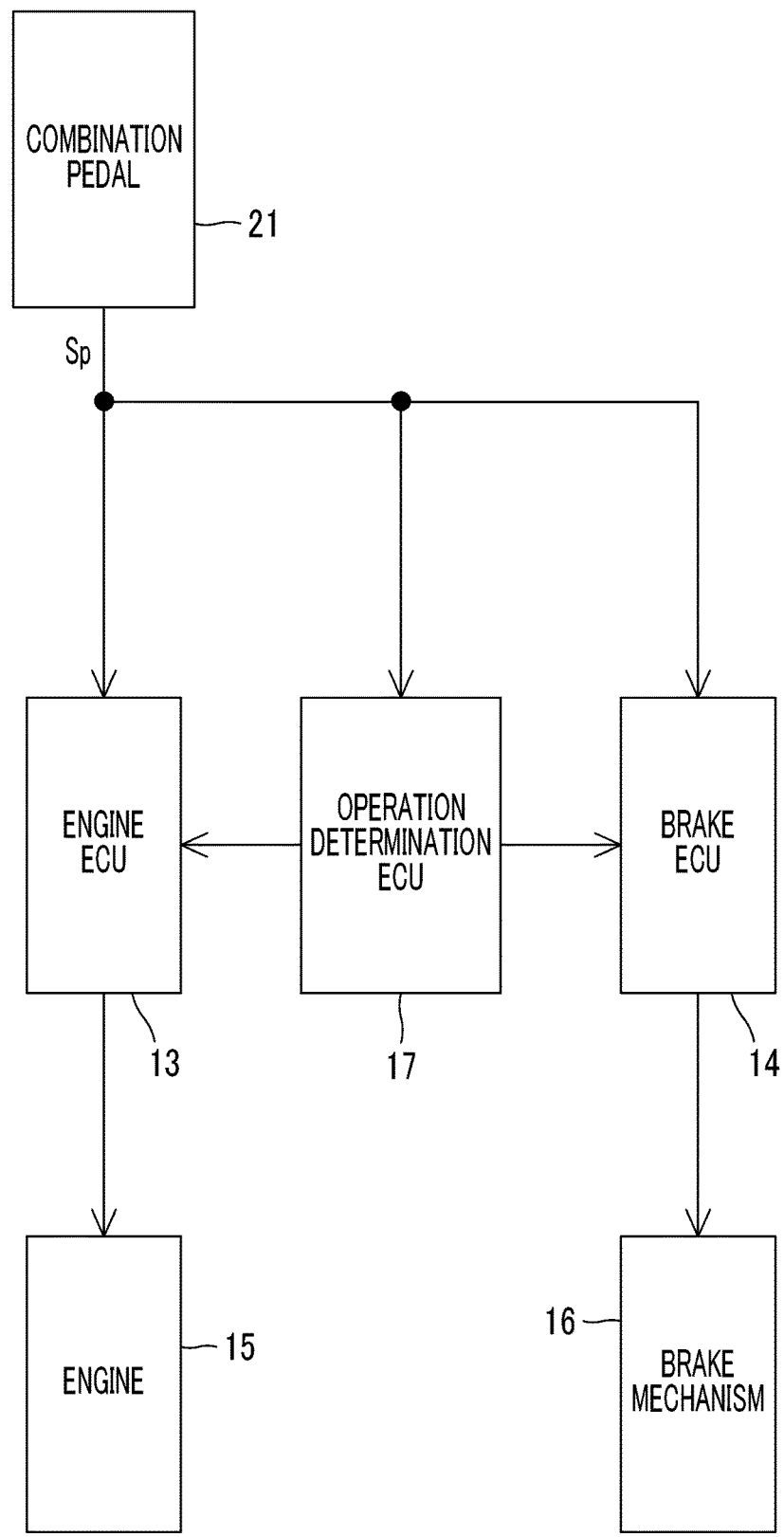
FIG. 12 is a block diagram showing the configuration of a vehicle including a single combination pedal usable as both of an accelerator pedal and a brake pedal.

For this reason, as shown in FIG. 12, in a case where the operation determination ECU 17 is mounted in a vehicle 2 including a single combination pedal 21 usable as both of the accelerator pedal 11 and the brake pedal 12 instead of the accelerator pedal 11 and the brake pedal 12, the operation determination ECU 17 can appropriately determine whether the occupant is operating the combination pedal 21 as the accelerator pedal 11 or as the brake pedal 12 based on an operation signal Sp indicating an operation content of the combination pedal 21. Specifically, in a case where the calculated probability p that the actual operation pattern is the brake operation pattern is relatively small, the operation determination ECU 17 specifies that the occupant is operating the combination pedal 21 as the accelerator pedal 11. In a case where the calculated probability p that the actual operation pattern is the brake operation pattern is relatively large, the operation determination ECU 17 specifies that the occupant is operating the combination pedal 21 as the brake pedal 12. In a case where specification is made that the occupant is operating the combination pedal 21 as the accelerator pedal 11, the operation determination ECU 17 performs control such that the engine ECU 13 performs the control of the engine 15 based on the operation signal Sp, and performs control such that the brake ECU 14 does not perform the control of the brake mechanism 16 based on the operation signal Sp. In a case where specification is made that the occupant is operating the combination pedal 21 as the brake pedal 12, the operation determination ECU 17 performs control such that the engine ECU 13 does not perform the control of the engine 15 based on the operation signal Sp, and performs control that the brake ECU 14 performs the control of the brake mechanism 16 based on the operation signal Sp.

That is, in a third modification example, the operation determination ECU 17 is an operation content determination device that, in a vehicle including an operation pedal that is operable by an occupant for driving the vehicle, determines whether the occupant is operating the operation pedal as an accelerator pedal or a brake pedal, and may acquire operation information relating to an operation content of the operation pedal by the occupant. The operation determination ECU 17 may determine whether the occupant is operating the operation pedal as a first type of pedal or a second type of pedal different from the first type of pedal based on the acquired operation information. The operation determination ECU 17 may function as an operation content determination device that learns at least one of an operation content in a case where the operation pedal is operated as the first type of pedal and an operation content in a case where the operation pedal is operated as the second type of pedal, and determines whether the occupant is operating the operation pedal as the first type of pedal or the second type of pedal based on a result of learning. In this case, the first type of pedal may be an accelerator pedal, and the second type of pedal may be a brake pedal. In addition, in a case where the first type of pedal is an accelerator pedal and the second type of pedal is a brake pedal, the operation determination ECU 17 may function as an operation content determination device further including control means for performing control of a drive source configured to output the drive power of the vehicle according to an operation content of the operation pedal in a case where determination is made that the occupant is operating the operation pedal as the first type of pedal (that is, the accelerator pedal), and performing control of a braking device configured to output the braking force of the vehicle according to an operation content of the operation pedal in a case where determination is made that the occupant is operating the operation pedal as the second type of pedal (that is, the brake pedal).

In the third modification example described above, the operation determination ECU 17 can make the vehicle 2 including the single combination pedal 21 usable as both of the accelerator pedal 11 and the brake pedal 12 travel appropriately.

(4-4) Other Modification Examples

In the above description, the neural network 172 is a convolutional neural network. However, the neural network 172 may be other types of neural networks. For example, the neural network 172 may be a recurrent neural network (RNN). For example, the neural network 172 may be a long short term memory (LSTM).

In the above description, the operation determination ECU 17 includes the neural network 172 including both of the feature extraction unit 176 and the classifier 177. However, the operation determination ECU 17 may include a neural network not including at least one of the feature extraction unit 176 and the classifier 177 as long as the accelerator operation signal Spa and the brake operation signal Spb can be learned and determination can be appropriately made whether or not the occupant performs the erroneous operation. For example, the operation determination ECU 17 may separately include a neural network including the feature extraction unit 176, and the classifier 177. In this case, the classifier 177 may calculate the probability p that the actual operation pattern is the brake operation pattern, using a binary classification method by the neural network. Alternatively, the classifier 177 may calculate the probability p that the actual operation pattern is the brake operation pattern, using a binary classification method compliant with a predetermined supervised learning algorithm. As an example of the binary classification method compliant with a supervised learning algorithm, a logistic regression method, a passive aggressive (PA) method, a linear support vector machine (SVM) method, and the like are exemplified. Alternatively, the classifier 177 may calculate the probability p that the actual operation pattern is the brake operation pattern, using a binary classification method compliant with a predetermined unsupervised learning algorithm. As an example of the binary classification method compliant with an unsupervised learning algorithm, a K-means method, a mixed model separation method, an anomaly detection method, and the like are exemplified. Alternatively, the operation determination ECU 17 may separately include a neural network including the classifier 177, and the feature extraction unit 176.

In the above description, the operation determination ECU 17 includes the neural network 172. However, the operation determination ECU 17 may include a predetermined learning model (for example, a learning model using a genetic algorithm, a learning model using a predetermined mechanical learning method, or the like) that can learn the accelerator operation signal Spa and the brake operation signal Spb and can appropriately determine whether or not the occupant performs the erroneous operation as long as the accelerator operation signal Spa and the brake operation signal Spb can be learned and determination can be appropriately made whether or not the occupant performs the erroneous operation.

In the above description, the neural network 172 determines whether or not the occupant missteps on the accelerator pedal 11 instead of the brake pedal 12 based on the input accelerator operation signal Spa. However, the neural network 172 may determine whether or not the occupant missteps on the brake pedal 12 instead of the accelerator pedal 11 based on the input brake operation signal Spb. That is, the neural network 172 may determine whether or not the occupant missteps on the brake pedal 12 instead of the accelerator pedal 11 by calculating a feature quantity vector C of the input brake operation signal Spb and calculating a probability that an actual operation pattern indicated by the input brake operation signal Spb is an accelerator operation pattern. In addition, in a case where the vehicle 1 includes another operation pedal (for example, a clutch pedal or the like) different from the accelerator pedal 11 and the brake pedal 12, the neural network 172 may determine whether or not the occupant missteps on another operation pedal instead of the accelerator pedal 11 or the brake pedal 12 based on an operation signal indicating an operation content of another operation pedal. That is, in a case where the vehicle 1 includes two predetermined operation pedals, the neural network 172 may determine whether or not the occupant missteps on a first operation pedal instead of the second operation pedal based on an operation signal indicating an operation content of the first operation pedal.

The disclosure is not limited to the above-described embodiment, and can be changed without departing from the disclosure that can be read from the claims and the entire specification. An erroneous operation determination device that involves such changes is also intended to be within the technical scope of the disclosure.

What is claimed is:

1. An erroneous operation determination device configured to, in a vehicle including a first operation pedal and a second operation pedal that are operable respectively by an occupant for driving the vehicle, determine whether the occupant performs an erroneous operation of misstepping on the first operation pedal instead of the second operation pedal, the erroneous operation determination device comprising an electronic control unit configured to
   acquire operation information relating to an operation content of the first operation pedal by the occupant and state information relating to a state of the occupant,
   determine whether the occupant performs the erroneous operation based on the acquired operation information and the acquired state information,
   learn the state of the occupant and at least one of the operation content of the first operation pedal and an operation content of the second operation pedal, and
   determine whether the occupant performs the erroneous operation based on a result of learning the state of the occupant and the at least one of the operation content of the first operation pedal and the operation content of the second operation pedal, wherein
   the state information includes information indicative of a gripping force applied by the occupant to a steering wheel and distinguishable between when the occupant operates the first operation pedal and when the occupant operates the second operation pedal,
   the first operation pedal is an accelerator pedal, and
   the second operation pedal is a brake pedal.

2. The erroneous operation determination device according to claim 1, wherein the electronic control unit is configured to learn at least one of the operation content of the first operation pedal when the occupant actually operates the first operation pedal in at least a part of a period during which the vehicle is traveling and the operation content of the second operation pedal when the occupant actually operates the second operation pedal.

3. The erroneous operation determination device according to claim 1, wherein the electronic control unit is configured to separately learn at least one of the operation content of the first operation pedal and the operation content of the second operation pedal under a situation in which the vehicle moves forward and at least one of the operation content of the first operation pedal and the operation content of the second operation pedal under a situation in which the vehicle moves backward.

4. The erroneous operation determination device according to claim 3, wherein the electronic control unit is configured to determine whether the occupant performs the erroneous operation under the situation in which the vehicle is moving forward based on the acquired operation information under the situation in which the vehicle moves forward and a result of learning of at least one of the operation content of the first operation pedal and the operation content of the second operation pedal under the situation in which the vehicle moves forward, and determine whether the occupant performs the erroneous operation under the situation in which the vehicle is moving backward based on the acquired operation information under the situation in which the vehicle moves backward and a result of learning of at least one of the operation content of the first operation pedal and the operation content of the second operation pedal under the situation in which the vehicle moves backward.

5. The erroneous operation determination device according to claim 1, wherein the electronic control unit is configured to adjust a criterion for determination in determining whether the occupant performs the erroneous operation based on a result of learning of at least one of the operation content of the first operation pedal and the operation content of the second operation pedal, and then, determine whether the occupant performs the erroneous operation.

6. The erroneous operation determination device according to claim 1, wherein:
the electronic control unit is configured to determine whether the occupant performs the erroneous operation using a learning model having the operation information as input and a determination result relating to whether a pattern of an operation content indicated by the input operation information is a pattern of the operation content of the first operation pedal or a pattern of the operation content of the second operation pedal as output; and
the electronic control unit is configured to make the learning model learn at least one of the operation content of the first operation pedal and the operation content of the second operation pedal to learn at least one of the operation content of the first operation pedal and the operation content of the second operation pedal.

7. The erroneous operation determination device according to claim 6, wherein the learning model is a model compliant with a neural network.

8. The erroneous operation determination device according to claim 1, wherein learning of at least one of the operation content of the first operation pedal and the operation content of the second operation pedal includes learning of a difference between the operation content of the first operation pedal and the operation content of the second operation pedal.

9. The erroneous operation determination device according to claim 8, wherein the difference between the operation content of the first operation pedal and the operation content of the second operation pedal is a difference in stroke amount between the first operation pedal and the second operation pedal.

10. The erroneous operation determination device according to claim 1, wherein the electronic control unit is configured to
i) when a pattern of the operation content indicated by the acquired operation information corresponds to a pattern of the operation content of the first operation pedal deduced from a result of learning of at least one of the operation content of the first operation pedal and the operation content of the second operation pedal, determine that the occupant does not perform the erroneous operation, and
ii) when the pattern of the operation content indicated by the acquired operation information corresponds to a pattern of the operation content of the second operation pedal deduced from a result of learning of at least one of the operation content of the first operation pedal and the operation content of the second operation pedal, determine that the occupant performs the erroneous operation.

11. The erroneous operation determination device according to claim 1, wherein the state information includes an output of a sensor that is mounted in the vehicle and detects the state of the occupant.

12. The erroneous operation determination device according to claim 1, wherein the first operation pedal and the second operation pedal are constituted of a combination pedal that is used for both of operation as the first operation pedal and operation as the second operation pedal.

* * * * *